(12) United States Patent
Islam et al.

(10) Patent No.: US 11,974,144 B2
(45) Date of Patent: Apr. 30, 2024

(54) CONFIGURING BEAM MANAGEMENT BASED ON SKIPPED TRANSMISSIONS OF SIGNALS ASSOCIATED WITH BEAM MANAGEMENT

(71) Applicant: QUALCOMM Incorporated, San Diego, CA (US)

(72) Inventors: Muhammad Nazmul Islam, Littleton, MA (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 17/302,852

(22) Filed: May 13, 2021

(65) Prior Publication Data

US 2022/0369121 A1    Nov. 17, 2022

(51) Int. Cl.
*H04W 16/28* (2009.01)
*H04B 7/08* (2006.01)
*H04W 24/10* (2009.01)
*H04W 56/00* (2009.01)

(52) U.S. Cl.
CPC ............ *H04W 16/28* (2013.01); *H04B 7/088* (2013.01); *H04W 24/10* (2013.01); *H04W 56/001* (2013.01)

(58) Field of Classification Search
CPC ... H04W 16/28; H04W 24/10; H04W 56/001; H04B 7/088
See application file for complete search history.

(56) References Cited

U.S. PATENT DOCUMENTS

| | | | |
|---|---|---|---|
| 2016/0227495 A1* | 8/2016 | Lee | H04L 5/0048 |
| 2019/0393980 A1* | 12/2019 | Lin | A01K 63/047 |
| 2020/0107309 A1* | 4/2020 | Akoum | H04W 72/046 |
| 2022/0132493 A1* | 4/2022 | Fakoorian | H04W 80/02 |

FOREIGN PATENT DOCUMENTS

| | | | |
|---|---|---|---|
| WO | 2019210185 A1 | 10/2019 | |
| WO | 2020083121 A1 | 4/2020 | |

OTHER PUBLICATIONS

International Search Report and Written Opinion—PCT/US2022/072252—ISA/EPO—dated Aug. 8, 2022.

* cited by examiner

*Primary Examiner* — Fred A Casca
(74) *Attorney, Agent, or Firm* — Harrity & Harrity, LLP

(57) ABSTRACT

Various aspects of the present disclosure generally relate to wireless communication. In some aspects, a user equipment (UE) may receive an indication regarding one or more signals associated with beam management, the indication indicating one or more future time periods for which the UE may not receive one or more transmissions of the one or more signals. The UE may configure a beam management configuration of the UE based at least in part on the indication. Numerous other aspects are described.

30 Claims, 15 Drawing Sheets

CONFIGURING BEAM MANAGEMENT BASED ON SKIPPED TRANSMISSIONS OF SIGNALS ASSOCIATED WITH BEAM MANAGEMENT

FIELD OF THE DISCLOSURE

Aspects of the present disclosure generally relate to wireless communication and to techniques and apparatuses for configuring beam management based on skipped transmissions of signals associated with beam management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving an indication regarding one or more signals associated with beam management, the indication indicating one or more future time periods for which the UE may not receive one or more transmissions of the one or more signals; and configuring a beam management configuration of the UE based at least in part on the indication.

In some aspects, a method of wireless communication performed by a base station includes transmitting an indication regarding one or more first signals associated with beam management, the indication indicating one or more future time periods for which the base station will skip transmission of the one or more signals; and transmitting, based at least in part on the indication, one or more second signals associated with beam management.

In some aspects, a method of wireless communication performed by a repeater includes transmitting an indication regarding one or more first signals associated with beam management, the indication indicating one or more future time periods for which the repeater will skip forwarding of the one or more signals via a first set of resources; and transmitting, via the first set of resources and during one or more other time periods that do not coincide with the future time periods, one or more second signals associated with beam management.

In some aspects, a UE for wireless communication includes a memory; and one or more processors, coupled to the memory, configured to: receive an indication regarding one or more signals associated with beam management, the indication indicating one or more future time periods for which the UE may not receive one or more transmissions of the one or more signals; and configure a beam management configuration of the UE based at least in part on the indication.

In some aspects, a base station for wireless communication includes a memory; and one or more processors, coupled to the memory, configured to: transmit an indication regarding one or more first signals associated with beam management, the indication indicating one or more future time periods for which the base station will skip transmission of the one or more signals; and transmit, based at least in part on the indication, one or more second signals associated with beam management.

In some aspects, a repeater for wireless communication includes a memory; and one or more processors, coupled to the memory, configured to: transmit an indication regarding one or more first signals associated with beam management, the indication indicating one or more future time periods for which the repeater will skip forwarding of the one or more signals via a first set of resources; and transmit, via the first set of resources and during one or more other time periods that do not coincide with the future time periods, one or more second signals associated with beam management.

In some aspects, a non-transitory computer-readable medium storing a set of instructions for wireless communication includes one or more instructions that, when executed by one or more processors of a UE, cause the UE to: receive an indication regarding one or more signals associated with beam management, the indication indicating one or more future time periods for which the UE may not receive one or more transmissions of the one or more signals; and configure a beam management configuration of the UE based at least in part on the indication.

In some aspects, a non-transitory computer-readable medium storing a set of instructions for wireless communication includes one or more instructions that, when executed by one or more processors of a base station, cause the base station to: transmit an indication regarding one or more first signals associated with beam management, the indication indicating one or more future time periods for which the base station will skip transmission of the one or more signals; and transmit, based at least in part on the indication, one or more second signals associated with beam management.

In some aspects, a non-transitory computer-readable medium storing a set of instructions for wireless communication includes one or more instructions that, when executed by one or more processors of a repeater, cause the repeater to: transmit an indication regarding one or more first signals associated with beam management, the indication indicating one or more future time periods for which the repeater will skip forwarding of the one or more signals via a first set of resources; and transmit, via the first set of resources and during one or more other time periods that do not coincide with the future time periods, one or more second signals associated with beam management.

In some aspects, an apparatus for wireless communication includes means for receiving an indication regarding one or more signals associated with beam management, the indication indicating one or more future time periods for which the UE may not receive one or more transmissions of the one or more signals; and means for configuring a beam management configuration of the UE based at least in part on the indication.

In some aspects, an apparatus for wireless communication includes means for transmitting an indication regarding one or more first signals associated with beam management, the indication indicating one or more future time periods for which the base station will skip transmission of the one or more signals; and means for transmitting, based at least in part on the indication, one or more second signals associated with beam management.

In some aspects, an apparatus for wireless communication includes means for transmitting an indication regarding one or more first signals associated with beam management, the indication indicating one or more future time periods for which the repeater will skip forwarding of the one or more signals via a first set of resources; and means for transmitting, via the first set of resources and during one or more other time periods that do not coincide with the future time periods, one or more second signals associated with beam management.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
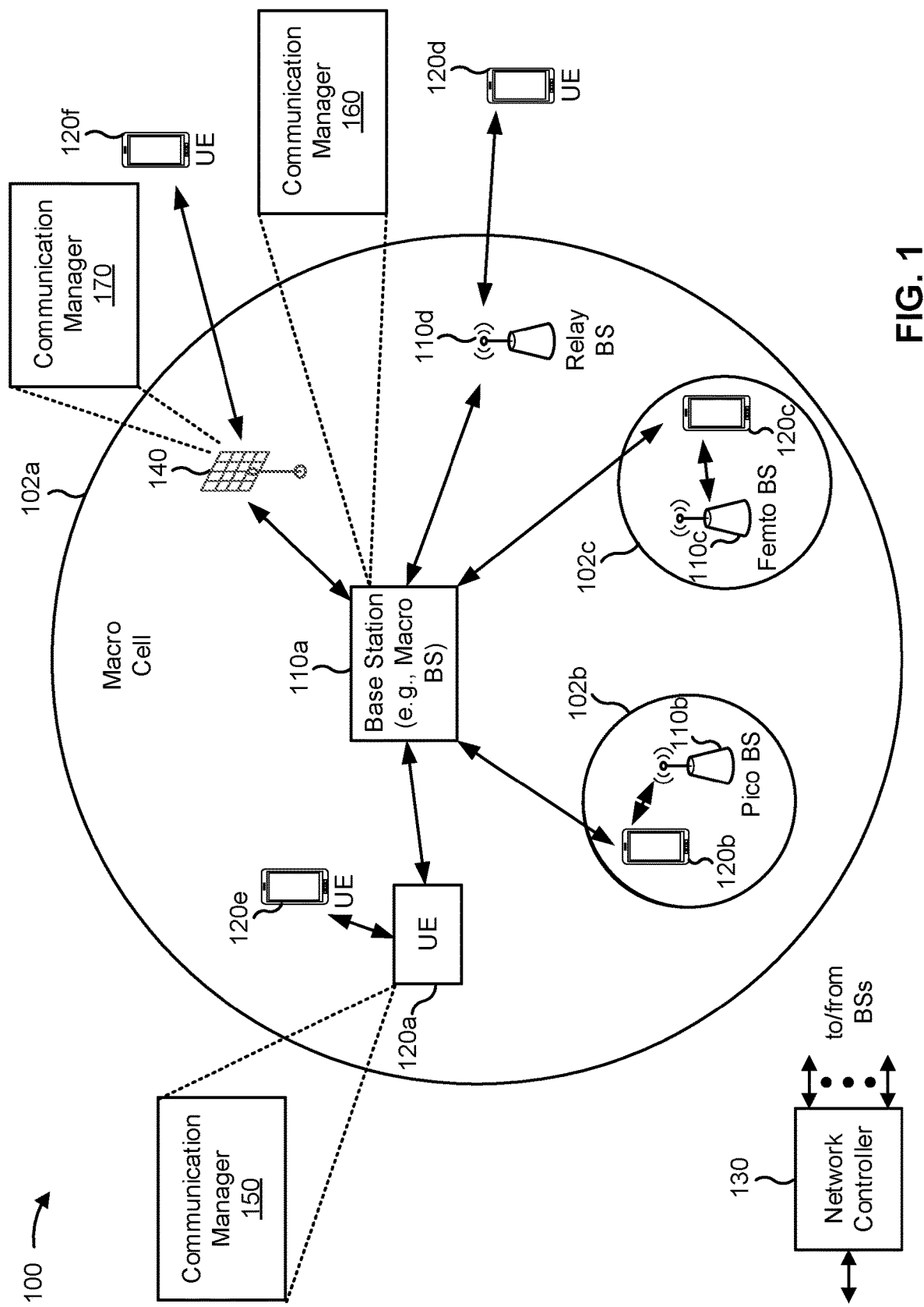
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In some aspects, a repeater 140 may receive a radio frequency (RF) analog signal (e.g., an analog millimeter wave signal) from a base station 110, may amplify the RF analog signal, and may transmit the amplified RF signal to one or more UEs 120 (e.g., shown as UE 120f). In some aspects, the repeater 140 may be an analog millimeter wave (mmW) repeater, sometimes also referred to as a layer 1 mmW repeater. Additionally, or alternatively, the repeater 140 may be a wireless TRP acting as a distributed unit (e.g., of a 5G access node) that communicates wirelessly with a base station 110 acting as a central unit or an access node controller (e.g., of the 5G access node). In some aspects, the repeater 140 may receive, amplify, and transmit an RF analog signal without performing analog-to-digital conversion of the RF analog signal and/or without performing any digital signal processing on the RF analog signal. In this way, latency may be reduced and a cost to produce the repeater 140 may be reduced. Additional details regarding repeater 140 are provided elsewhere herein.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 150. As described in more detail elsewhere herein, the communication manager 150 may receive an indication regarding one or more signals associated with beam management, the indication indicating one or more future time periods for which the UE may not receive one or more transmissions of the one or more signals; and configure a beam management configuration of the UE based at least in part on the indication. Additionally, or alternatively, the communication manager 150 may perform one or more other operations described herein.

In some aspects, the base station 110 may include a communication manager 160. As described in more detail elsewhere herein, the communication manager 160 may transmit an indication regarding one or more first signals associated with beam management, the indication indicating one or more future time periods for which the base station will skip transmission of the one or more signals; and transmit, based at least in part on the indication, one or more second signals associated with beam management. Additionally, or alternatively, the communication manager 160 may perform one or more other operations described herein.

In some aspects, the repeater 140 may include a communication manager 170. As described in more detail elsewhere herein, the communication manager 170 may transmit an indication regarding one or more first signals associated with beam management, the indication indicating one or more future time periods for which the repeater will skip forwarding of the one or more signals via a first set of resources; and transmit, via the first set of resources and during one or more other time periods that do not coincide with the future time periods, one or more second signals associated with beam management. Additionally, or alternatively, the communication manager 170 may perform one or more other operations described herein.

As indicated above, FIG. 1 is provided as an example. Other examples may differ from what is described with regard to FIG. 1.

Figure 2:
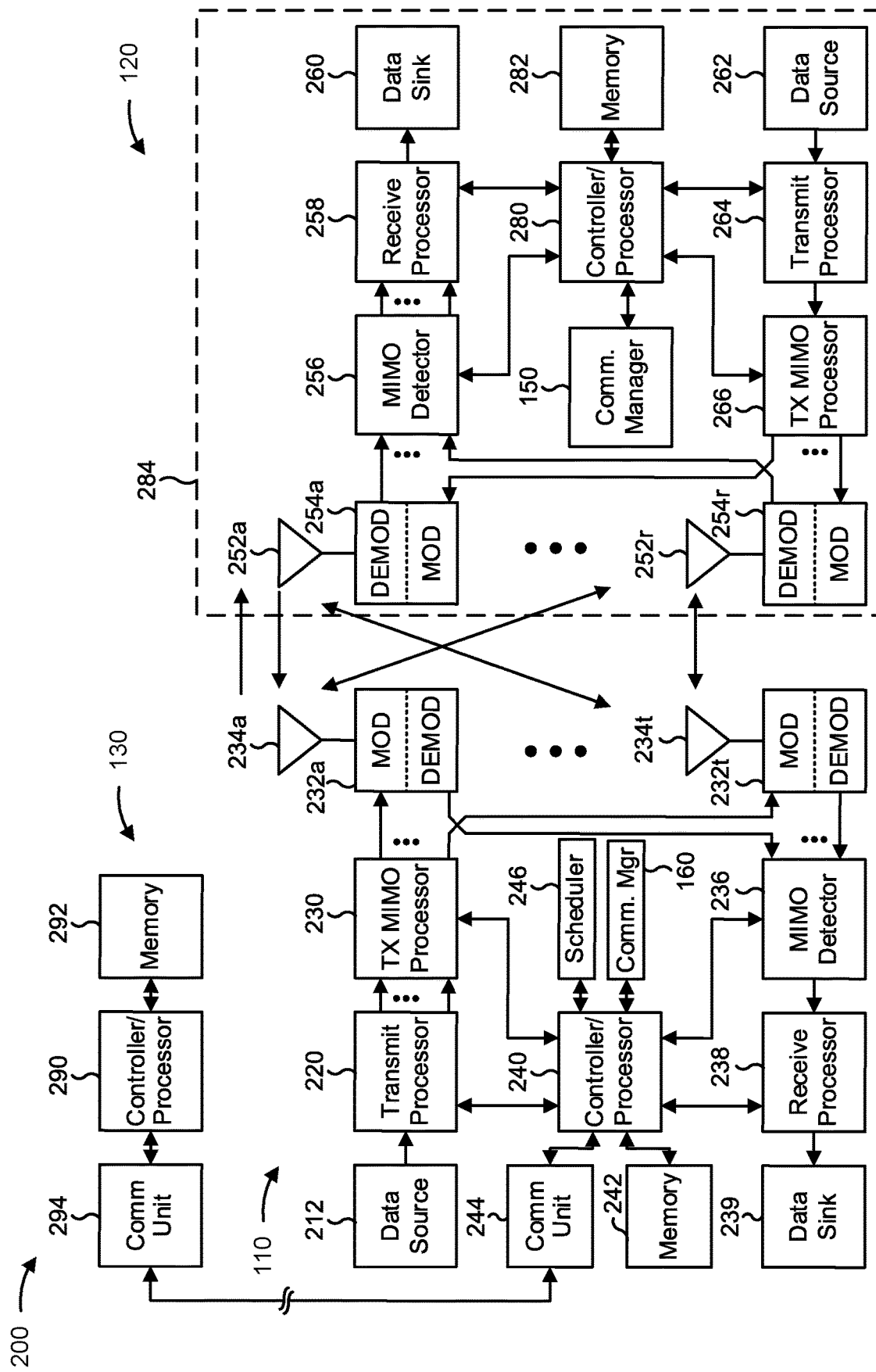
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs.

Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 8-12.

Figure 10:
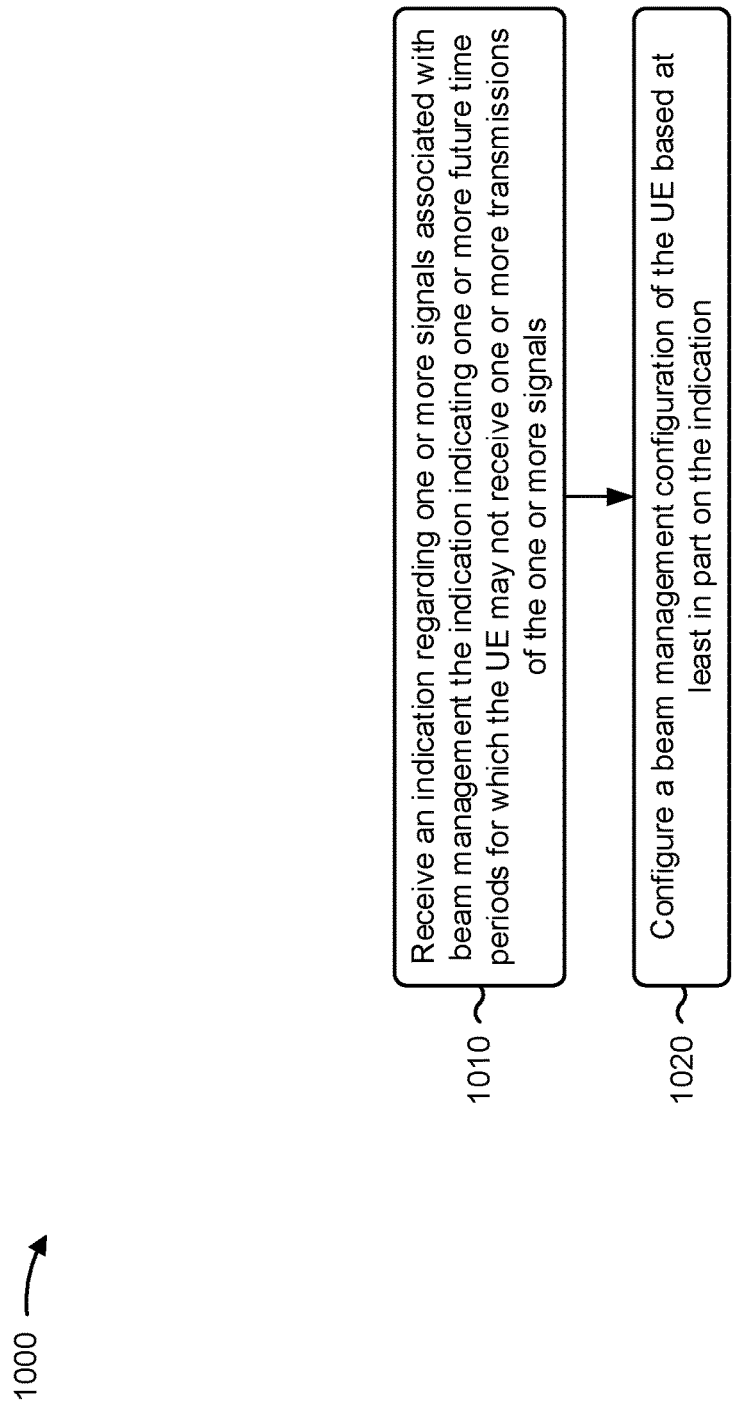
FIGS. 10-12 are diagrams illustrating example processes associated with skipped transmissions of signals associated with beam management, in accordance with the present disclosure.
Figure 11:
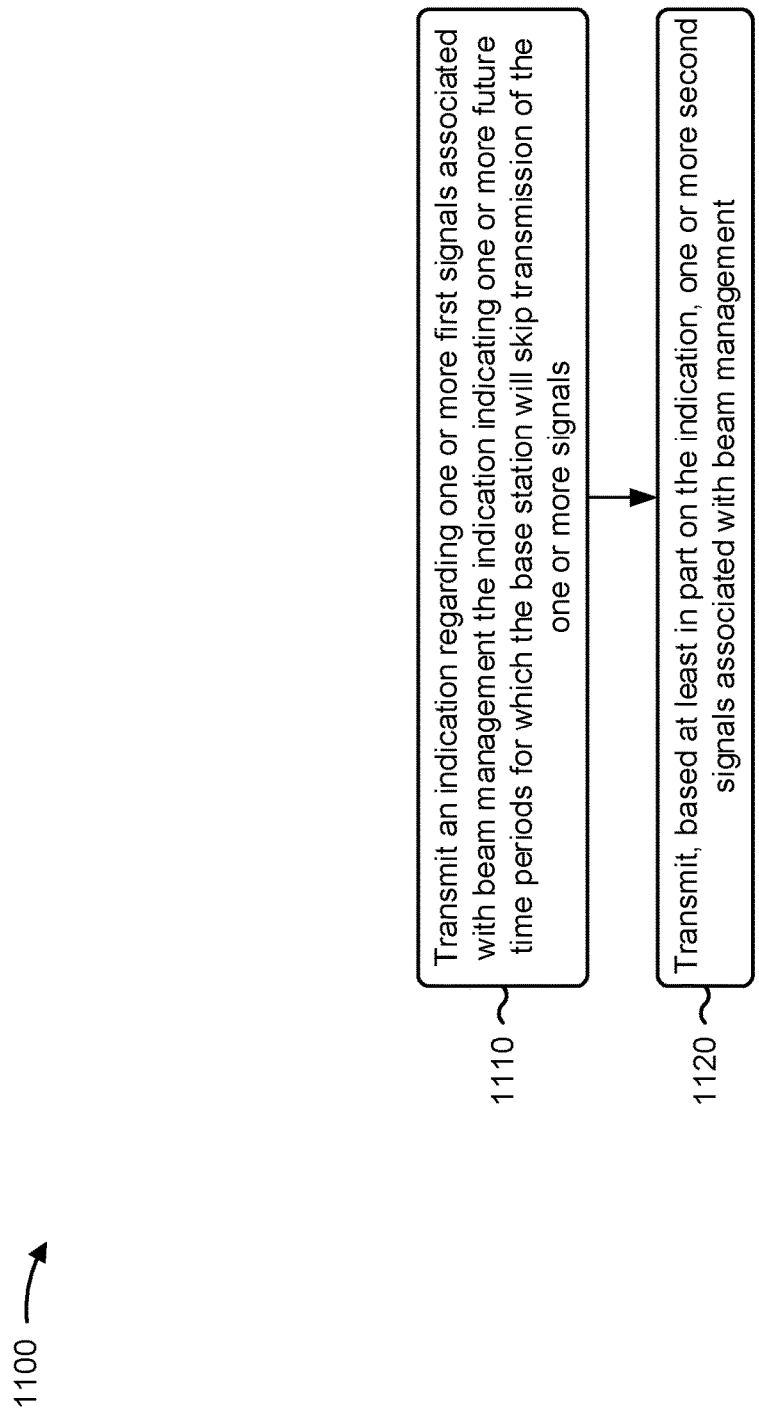
Figure 12:
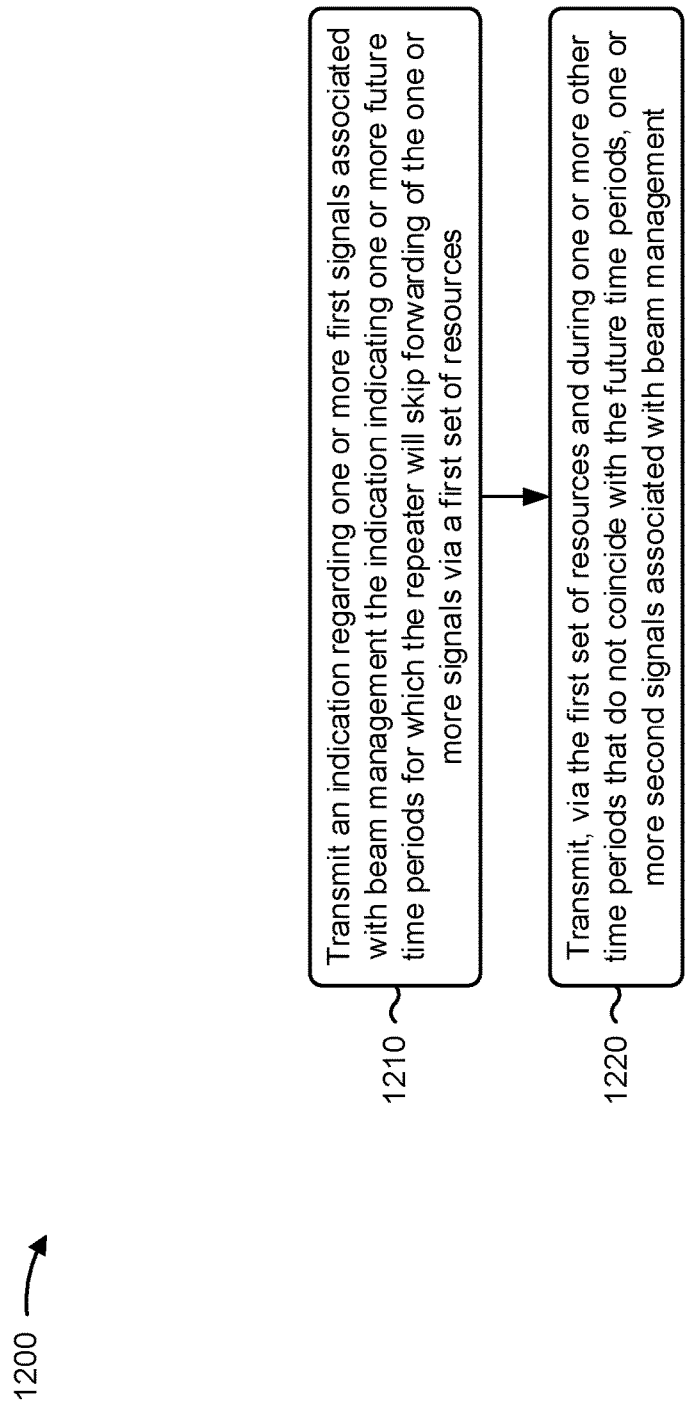

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 8-12. Controller/processor 240 of base station 110, controller/processor 280 of UE 120, and/or any other component(s) of FIG. 2 may perform one or more techniques associated with configuring beam management based on skipped transmissions of signals associated with beam management, as described in more detail elsewhere herein. In some aspects, the repeater 140 described herein is the base station 110, is included in the base station 110, or includes one or more components of the base station 110 shown in FIG. 2. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting)

by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, the UE includes means for receiving an indication regarding one or more signals associated with beam management, the indication indicating one or more future time periods for which the UE may not receive one or more transmissions of the one or more signals; and/or means for configuring a beam management configuration of the UE based at least in part on the indication. The means for the UE to perform operations described herein may include, for example, one or more of communication manager 150, antenna 252, demodulator 254, MIMO detector 256, receive processor 258, transmit processor 264, TX MIMO processor 266, modulator 254, controller/processor 280, or memory 282.

In some aspects, the base station includes means for transmitting an indication regarding one or more first signals associated with beam management, the indication indicating one or more future time periods for which the base station will skip transmission of the one or more signals; and/or means for transmitting, based at least in part on the indication, one or more second signals associated with beam management. The means for the base station to perform operations described herein may include, for example, one or more of communication manager 160, transmit processor 220, TX MIMO processor 230, modulator 232, antenna 234, demodulator 232, MIMO detector 236, receive processor 238, controller/processor 240, memory 242, or scheduler 246.

In some aspects, the repeater includes means for transmitting an indication regarding one or more first signals associated with beam management, the indication indicating one or more future time periods for which the repeater will skip forwarding of the one or more signals via a first set of resources; and/or means for transmitting, via the first set of resources and during one or more other time periods that do not coincide with the future time periods, one or more second signals associated with beam management. In some aspects, the means for the repeater to perform operations described herein may include, for example, one or more of communication manager 170, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
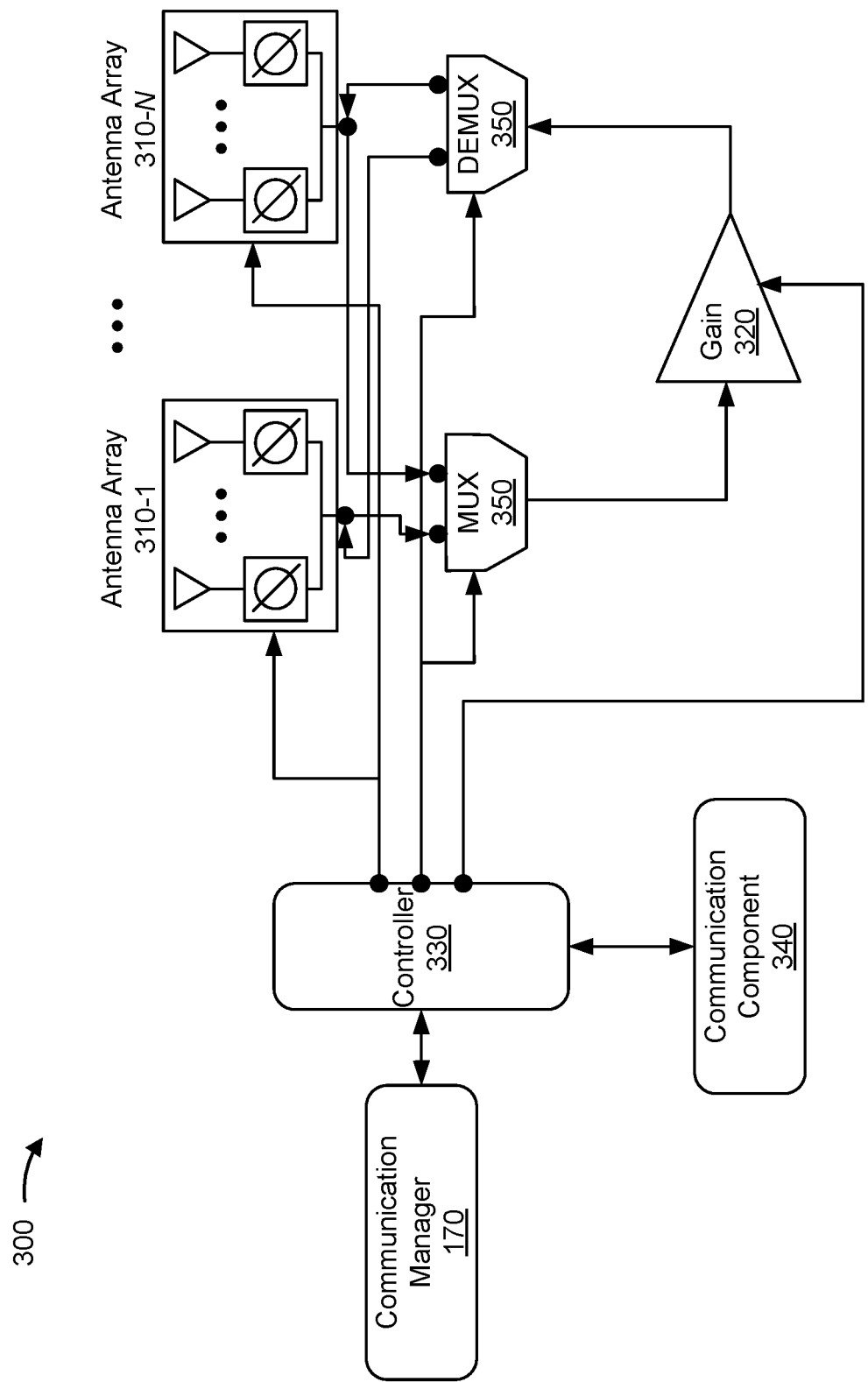
FIG. 3 is a diagram illustrating an example of a millimeter wave repeater, in accordance with the present disclosure.

FIG. 3 is a diagram illustrating an example of a millimeter wave repeater 300, in accordance with the present disclosure. In some aspects, millimeter wave repeater 300 may correspond to millimeter wave repeater 140 shown in FIG. 1. As shown in FIG. 3, the millimeter wave repeater 300 may include one or more antenna arrays 310-1 through 310-N (N>1), a gain component 320, a controller 330, a communication manager 170, a communication component 340, and a multiplexer (MUX) and/or demultiplexer (DEMUX) (MUX/DEMUX) 350.

An antenna array 310 includes multiple antenna elements capable of being configured for beamforming. For example, an antenna array 310 may be referred to as a phased array because phase values and/or phase offsets of the antenna elements may be configured to form a beam, with different phase values and/or phase offsets being used for different beams (e.g., in different directions). In some aspects, an antenna array 310 may be a fixed receive (RX) antenna array capable of only receiving communications while not transmitting communications. In some aspects, an antenna array 310 may be a fixed TX antenna array capable of only transmitting communications while not receiving communications. In some aspects, an antenna array 310 may be capable of being configured to act as an RX antenna array or a TX antenna array (e.g., via a TX/RX switch and/or a MUX/DEMUX). The antenna arrays 310 may be capable of communicating using millimeter waves.

Gain component 320 includes a component capable of amplifying an input signal and outputting an amplified signal. For example, gain component 320 may include a power amplifier and/or a variable gain component. In some aspects, gain component 320 may have variable gain control. The gain component 320 may connect to an RX antenna array (e.g., a first antenna array 310-1) and a TX antenna array (e.g., a second antenna array 310-2) such that an analog millimeter wave signal, received via the RX antenna array, can be amplified by the gain component 320 and output to the TX antenna array for transmission. In some aspects, the level of amplification of the gain component 320 may be controlled by the controller 330.

Controller 330 includes a component capable of controlling one or more other components of the millimeter wave repeater 300. For example, the controller 330 may include a controller, a microcontroller, and/or a processor. In some aspects, the controller 330 may control the gain component 320 by controlling a level of amplification or gain applied by the gain component 320 to an input signal. Additionally, or alternatively, the controller 330 may control an antenna array 310 by controlling a beamforming configuration for the antenna array 310 (e.g., one or more phase values for the antenna array 310, one or more phase offsets for the antenna array 310, one or more power parameters for the antenna array 310, one or more beamforming parameters for the antenna array 310, a TX beamforming configuration, and/or an RX beamforming configuration), by controlling whether the antenna array 310 acts as an RX antenna array or a TX antenna array (e.g., by configuring interaction and/or connections between the antenna array 310 and a MUX/DEMUX 350) Additionally, or alternatively, the controller 330 may power on or power off one or more components of millimeter wave repeater 300 (e.g., when a base station 110 does not need to use the millimeter wave repeater to serve UEs 120). In some aspects, the controller 330 may control a timing of one or more of the above configurations.

Communication component 340 may include a component capable of wirelessly communicating with a base station 110 using a wireless technology other than millimeter wave (e.g., via a control interface). For example, the communication component 340 may communicate with the base station 110 using a personal area network (PAN) technology (e.g., Bluetooth or Bluetooth Low Energy (BLE)), a 4G or LTE radio access technology, a narrowband Internet of Things (NB-IoT) technology, a sub-6 GHz technology, a visible light communication technology, and/the like. In some aspects, the communication component 340 may use a lower frequency communication technology, and an antenna array 310 may use a higher frequency communication technology (e.g., millimeter wave). In some aspects, an antenna array 310 may be used to transfer data between the millimeter wave repeater 300 and the base station 110, and the communication component 340 may be used to transfer control information between the millimeter wave repeater 300 and the base station 110 (e.g., a report, a configuration, and/or instructions to power on or power off one or more components).

MUX/DEMUX 350 may be used to multiplex and/or demultiplex communications received from and/or transmitted to an antenna array 310. For example, MUX/DEMUX 350 may be used to switch an RX antenna array to a TX antenna array.

In some aspects, the millimeter wave repeater 300 does not include any components for digital signal processing. For example, in some aspects, the millimeter wave repeater 300 does not include a digital signal processor, a baseband processor, a digital-to-analog converter (DAC), and/or an analog-to-digital converter (ADC). In this way, a cost to produce the millimeter wave repeater 300 may be reduced. Furthermore, latency may be reduced by eliminating digital processing of received millimeter wave signals prior to transmission of corresponding amplified millimeter wave signals.

As indicated above, FIG. 3 is provided as an example. Other examples may differ from what is described with regard to FIG. 3. For example, millimeter wave repeater 300 may include additional components, fewer components, different components, or differently arranged components than those shown in FIG. 3. Furthermore, two or more components shown in FIG. 3 may be implemented within a single component, or a single component shown in FIG. 3 may be implemented as multiple components. Additionally, or alternatively, a set of components (e.g., one or more components) of millimeter wave repeater 300 may perform one or more functions described as being performed by another set of components of millimeter wave repeater 300.

Figure 4:
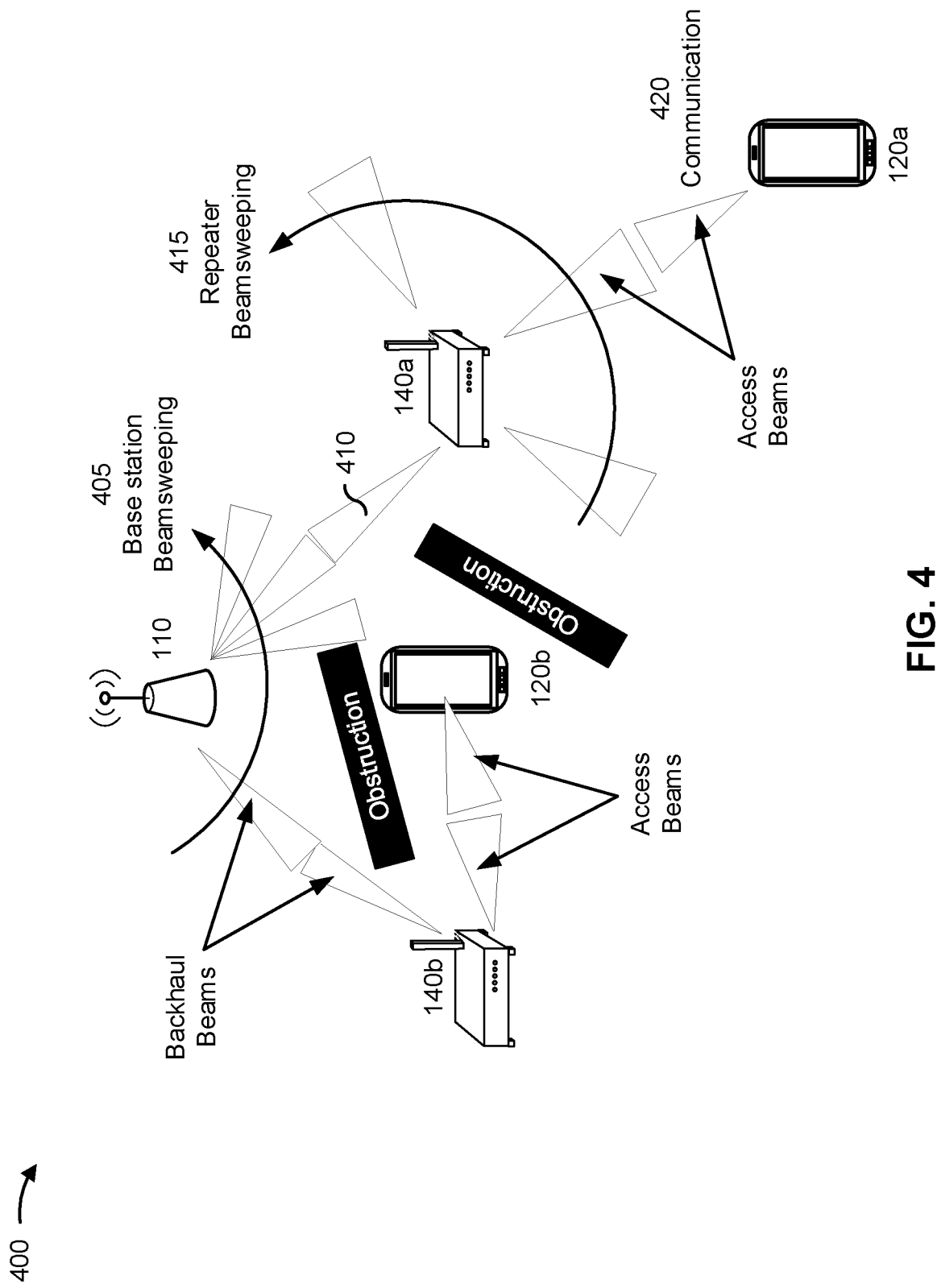
FIG. 4 is a diagram illustrating an example of communicating using a millimeter wave repeater, in accordance with the present disclosure.

FIG. 4 is a diagram illustrating an example 400 of communicating using a millimeter wave repeater, in accordance with the present disclosure.

Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station 110 that communicates using the sub-6 GHz radio waves. However, a millimeter wave may not be capable of penetrating the same wall (e.g., depending on a thickness of the wall and/or a material from which the wall is constructed). Some techniques and apparatuses described herein use a millimeter wave repeater 140 (which includes, in the example of FIG. 4, repeater 140a and repeater 140b) to increase the coverage area of a base station 110 and/or to extend coverage to UEs 120 (which include, in the example of FIG. 4, UE 120a and UE 120b) without line of sight to the base station 110 (e.g., due to an obstruction).

For example, as illustrated in the example of FIG. 4, an obstruction between UE 120b and base station 110 blocks or otherwise reduces the quality of a link between the base station 110 and UE 120b. Similarly, an obstruction between UE 120b and repeater 140a blocks or otherwise reduces the quality of a link between the repeater 140a and the UE 120b. However, no obstructions or fewer obstructions exist between repeater 140b and UE 120b, and, as such, it is possible that communications between repeater 140b and UE 120b will have a higher quality than communications between base station 110 and UE 120b or between repeater 140a and UE 120b. Furthermore, the millimeter wave repeater 140 described herein may be a layer 1 or an analog millimeter wave repeater, which is associated with a lower cost, less processing, and lower latency than a layer 2 or layer 3 repeater.

A millimeter wave repeater 140 (sometimes referred to herein as a repeater 140) may perform directional communication by using beamforming to communicate with a base station 110 via a first beam pair (e.g., a backhaul beam pair over a backhaul link with the base station 110) and to communicate with a UE 120 via a second beam pair (e.g., an access beam pair over an access link with the UE 120). For example, in example 400, repeater 140a can communicate with base station 110 via a first beam pair and can communicate with UE 120a via a second beam pair. Similarly, repeater 140b can communicate with base station 110 via a first beam pair and can communicate with UE 120a via a second beam pair. A beam pair may refer to a TX beam used by a first device for transmission and an RX beam used by a second device for reception of information transmitted by the first device via the TX beam.

As shown by reference number 405, a base station 110 may use a beamsweeping procedure to transmit communications via multiple beams over time (e.g., using time division multiplexing (TDM)). As shown by reference number 410, the repeater 140a may receive a communication via an RX beam of the repeater 140a. As shown by reference number 415, the repeater 140a may relay each received communication via multiple TX beams of the repeater 140a (e.g., using TDM). As used herein, "relaying a communication" may refer to transmitting the received communication (e.g., after amplifying the received communication) without decoding the received communication and/or without modifying information carried in the received communication. Alternatively, "relaying a received communication" may refer to transmitting the received communication after decoding the received communication and/or modifying information carried in the received communication. In some aspects, a received communication may be relayed using a different time resource, a different frequency resource, and/or a different spatial resource (e.g., a different beam) to transmit the communication as compared to a time resource, a frequency resource, and/or a spatial resource in which the communication was received. As shown by reference number 420, a UE 120a may receive a relayed communication. In some aspects, the UE 120a may generate a communication to be transmitted to the base station 110. The UE 120a may then transmit the communication to the repeater 140a for relaying to the base station 110.

As indicated above, FIG. 4 is provided as an example. Other examples may differ from what is described with regard to FIG. 4.

Figure 5:
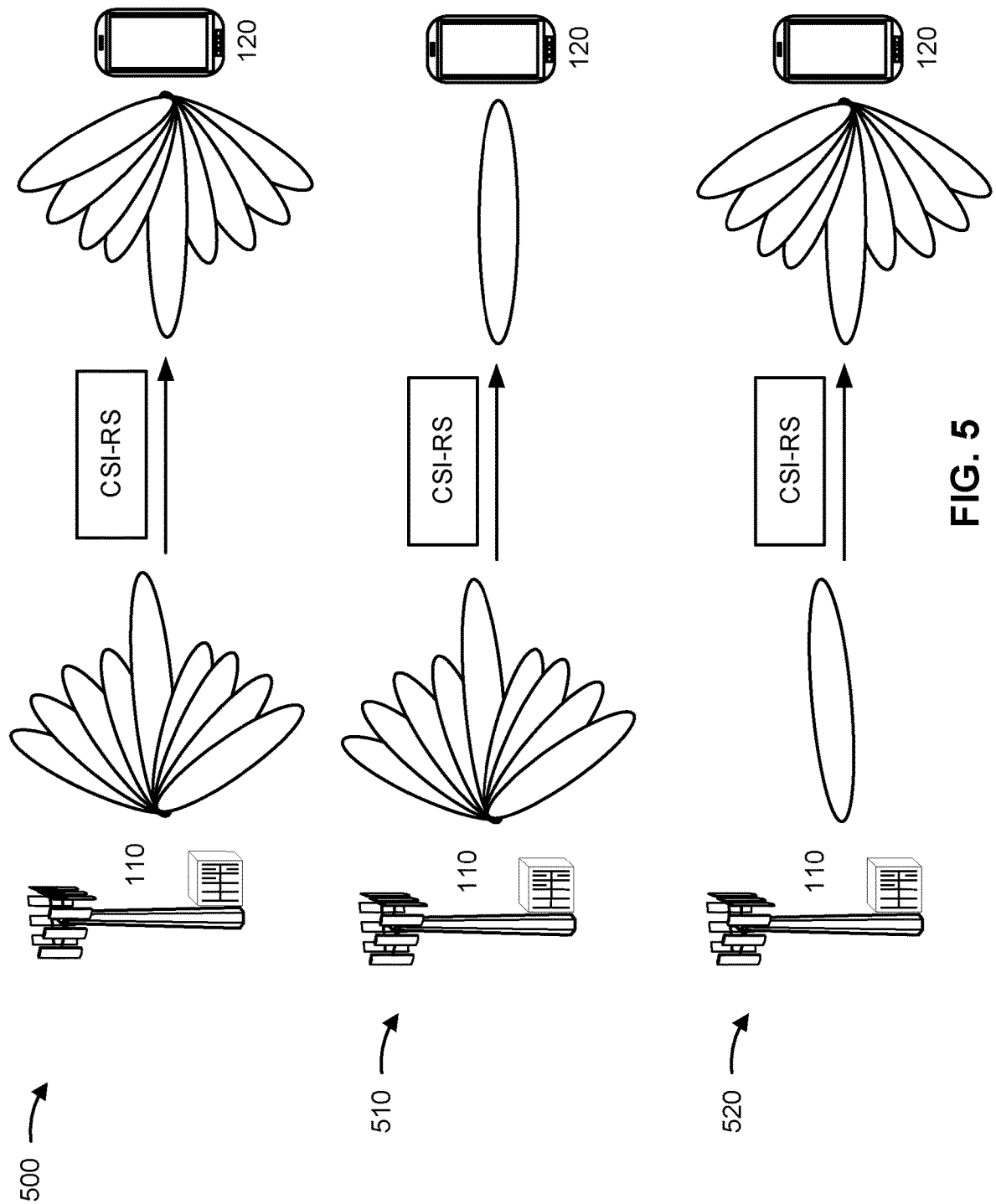
FIG. 5 is a diagram illustrating examples of channel state information reference signal (CSI-RS) beam management procedures, in accordance with the present disclosure

FIG. 5 is a diagram illustrating examples 500, 510, and 520 of channel state information reference signal (CSI-RS) beam management procedures, in accordance with the present disclosure. As shown in FIG. 5, examples 500, 510, and 520 include a UE 120 in communication with a base station 110 in a wireless network (e.g., wireless network 100). However, the devices shown in FIG. 5 are provided as examples, and the wireless network may support communication and beam management between other devices (e.g., between a UE 120 and a base station 110 or TRP, between a mobile termination node and a control node, between an integrated access and backhaul (IAB) child node and an IAB parent node, and/or between a scheduled node and a scheduling node). In some aspects, the beam management communications may be transmitted via a repeater. In some aspects, the UE 120 and the base station 110 may be in a connected state (e.g., a radio resource control (RRC) connected state).

As shown in FIG. 5, example 500 may include a base station 110 and a UE 120 communicating to perform beam management using CSI-RSs. Example 500 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 5 and example 500, CSI-RSs may be configured to be transmitted from the base station 110 to the UE 120. The CSI-RSs may be configured to be periodic (e.g., using RRC signaling), semi-persistent (e.g., using media access control (MAC) control element (MAC-CE) signaling), and/or aperiodic (e.g., using downlink control information (DCI)).

The first beam management procedure may include the base station 110 performing beam sweeping over multiple TX beams. The base station 110 may transmit a CSI-RS using each transmit beam for beam management. To enable the UE 120 to perform RX beam sweeping, the base station may use a transmit beam to transmit (e.g., with repetitions) each CSI-RS at multiple times within the same reference signal (RS) resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 500 has been described in connection with CSI-RSs, the first beam management process may also use synchronization signal blocks (SSBs) for beam management in a similar manner as described above.

As shown in FIG. 5, example 510 may include a base station 110 and a UE 120 communicating to perform beam management using CSI-RSs. Example 510 depicts a second beam management procedure (e.g., P2CSI-RS beam management). The second beam management procedure may be referred to as a beam refinement procedure, a base station beam refinement procedure, a TRP beam refinement procedure, and/or a transmit beam refinement procedure. As shown in FIG. 5 and example 510, CSI-RSs may be configured to be transmitted from the base station 110 to the UE 120. The CSI-RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 5, example 520 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 5 and example 520, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

While the examples 500, 510, and 520 of CSI-RS beam management procedures are described with reference to communications between the base station 110 and UE 120, in some aspects, beam management-related communications may be transmitted via a repeater (e.g., repeater 140) or relay (e.g., relay BS 110d), among other examples.

As indicated above, FIG. 5 is provided as an example of beam management procedures. Other examples of beam management procedures may differ from what is described with respect to FIG. 5. For example, the UE 120 and the base station 110 may perform the third beam management procedure before performing the second beam management procedure, and/or the UE 120 and the base station 110 may perform a similar beam management procedure to select a UE transmit beam.

Figure 6:
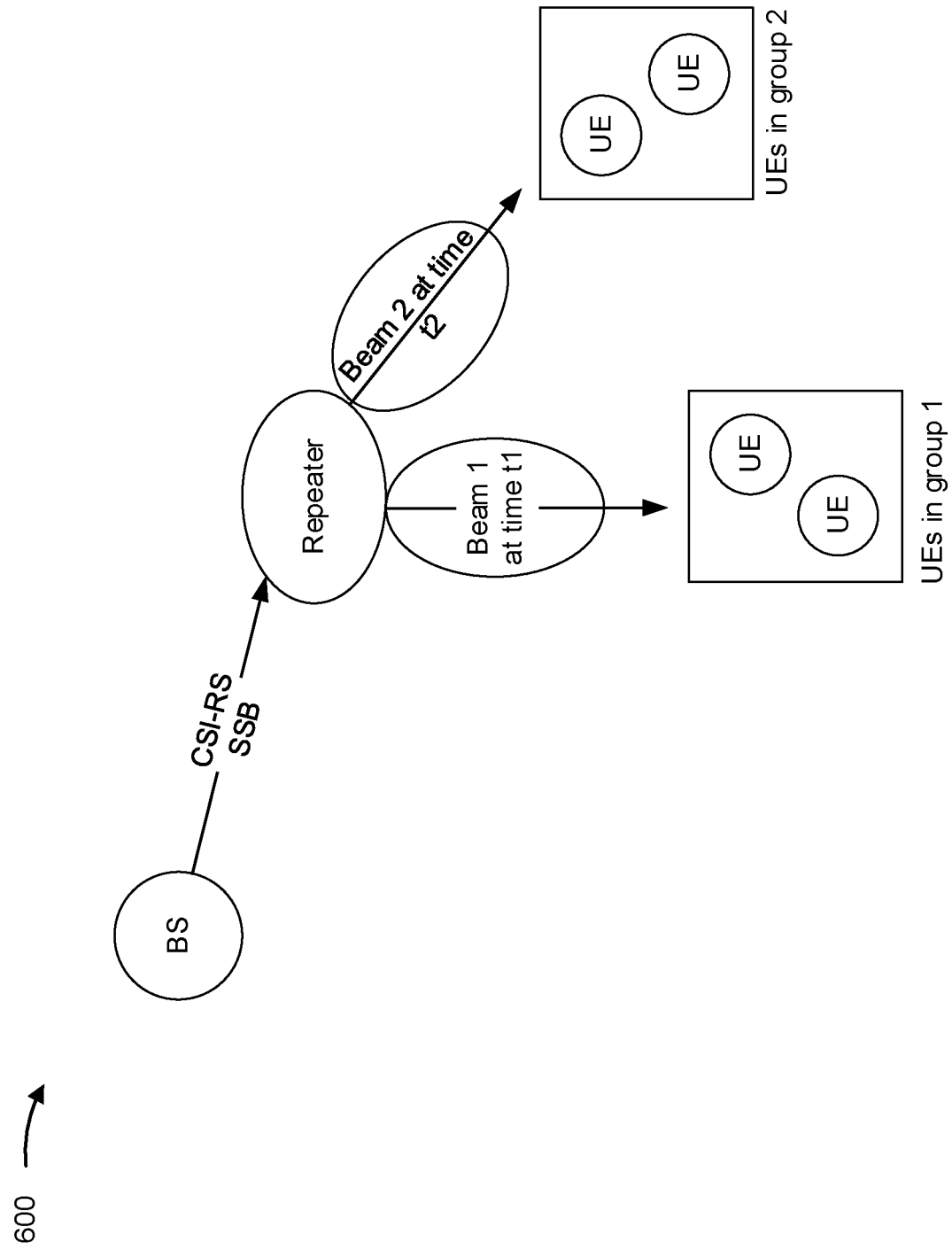
FIGS. 6 and 7 are diagrams illustrating examples of beam management-related signal transmission via a repeater, in accordance with the present disclosure.
Figure 7:
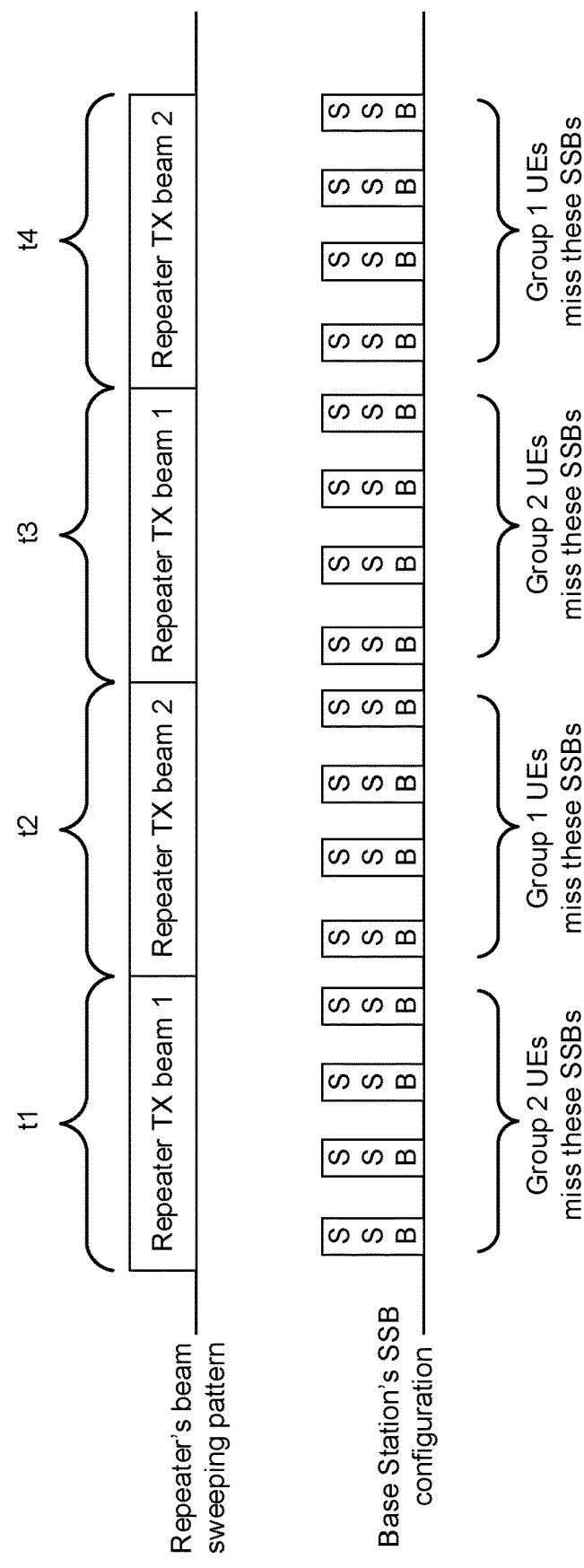

FIGS. 6 and 7 are diagrams illustrating examples 600 and 700 of beam management-related signal transmission via a repeater, in accordance with the present disclosure. The examples 600 and 700 depict an example situation where beam management-related signals may be "skipped" or otherwise not received by one or more UEs.

As shown in example 600, a base station may transmit one or more signals (e.g., SSB or CSI-RS, among other examples), associated with beam management, to different UEs via a repeater. In some situations, the repeater may not determine a beam direction of its access links. In this situation, the repeater may sweep beams in access links or rotate a reflector in a periodic manner. As shown in example 600, in this situation, different UEs may receive signals transmitted from the base station at different times and/or via different transmit beams. For example, a first group of UEs may receive the signal(s) transmitted by the base station at time t1 and via a first beam of the repeater, while a second group of UEs may receive the signal(s) at time t2 and via a second beam of the repeater.

As shown in example 700, the repeater's beam sweeping pattern may cause signals transmitted by the base station to be "skipped," or not received by one or more UEs. For example, the base station may be configured to repeatedly transmit SSBs (or CSI-RS, among other examples) periodically and at example times t1, t2, t3, and t4. In this example, as the repeater is not capable of transmitting to both the first and second groups of UEs (e.g., the groups of UEs depicted in example 600) at the same time, at time t1, the repeater transmits the SSBs on beam 1, which is directed towards the first group of UEs. In this situation, the second group of UEs (e.g., associated with beam 2 of the repeater) will miss the SSBs transmitted at t1. At time t2, the repeater transmits the SSBs on beam 2, which is directed towards the second group of UEs. In this situation, the first group of UEs (e.g., associated with beam 1 of the repeater) will miss the SSBs transmitted at t2. As the beam sweeping pattern is repeated for both the base station and the repeater, SSBs may continue to be missed by both groups of UEs.

As indicated above, FIGS. 6 and 7 are provided as examples. Other examples may differ from what is described with regard to FIGS. 6 and 7. For example, a variety of other situations may result in "skipped" transmissions of beam management signals that would otherwise be expected to be communicated from a base station to one or more UEs.

In some situations, a base station may mute transmission of SSBs, CSI-RS, and/or other reference signals that are intended for beam management (e.g., to conserve power at the base station). In some situations, a repeater may be in a transition mode (e.g., when adjusting power of the repeater) and may not send signals reliably enough for the purpose of measurement. This may follow a periodic pattern (e.g., signals that are close to a switch point in a slot format may be affected periodically).

In some situations, a base station and repeater may transmit beam management signals with different periodicity. For example, a base station may send beam management signals with T1 periodicity while a repeater may forward the beam management signals with T2 (e.g., reduced) periodicity. In this situation, a UE may observe some time periods during which beam management signals are sent by the base station only and other time periods when both the base station and the repeater are transmitting the beam management signals, which may force the UE to evaluate the beam management signals by nulling periods when the repeater is active.

In some situations, a repeater may be shared between multiple TRPs, distributed unit (DU) cells, and/or base stations using TDM. In this situation, the repeater may not always be available to forward signals for a given TRP, DU-cell, and/or base station. In some situations, a base station and/or UE may skip communications during a measurement gap, e.g., for self-interference measurements and/or calibration, among other examples. In this situation, the base station and/or UE may not transmit and/or receive beam management signals while performing another task that makes use of at least a portion of the resources used for beam management signal communications.

In situations where beam management signals are skipped, a UE may declare beam failure and/or candidate beam detection failure. While a UE may extend its beam evaluation period when other measurement patterns overlap with beam reference signals (e.g., SSB and/or CSI-RS, among other examples), doing so may waste resources (e.g., power resources and/or network resources, among other examples) when the original beam evaluation period and/or the extended period are during a period of time where beam management signals are being "skipped." In addition, a UE may still declare beam failure and/or candidate beam detection failure when beam management signals are not received by the UE, which may lead to additional beam sweeping, an unnecessary handover process, or other inefficiencies.

In some aspects described herein, a base station and/or repeater may transmit, and a UE may receive, an indication regarding one or more signals (e.g., SSB, and/or CSI-RS, among other examples) associated with beam management. The indication may indicate one or more future time periods during which the UE may not receive the one or more signals. For example, the base station and/or repeater may be associated with a muting pattern, beam transmission pattern, and/or the like, which might result in the one or more signals not being transmitted when the UE would otherwise be attempting to measure the one or more signals. Based at least in part on the indication, the UE may configure beam management, e.g., by adjusting one or more evaluation periods to either avoid measuring at an indicated time and/or extend an evaluation period using a scaling factor. When the base station and/or repeater transmits future signals associated with beam management according to the muting pattern, beam transmission pattern, and/or the like, the UE will be configured to handle the future signals.

In this way, some techniques and apparatuses described herein may enable a base station and/or repeater to provide information that enables a UE to configure beam management in a manner designed to account for a muting pattern, beam transmission pattern, and/or the like, associated with the base station and/or repeater. As a result, the UE may avoid unnecessarily declaring beam failure and/or candidate beam detection failure. This may conserve UE resources (e.g., power resources, processing resources, and/or network resources, among other examples) associated with beam sweeping, a handover process, or other inefficiencies that might otherwise arise in a situation where the UE did not account for skipped beam management signal transmissions. In addition, the UE may conserve resources (e.g., power resources, processing resources, and/or network resources, among other examples) that might otherwise be used to extend beam evaluation periods associated with skipped beam management signal transmissions, e.g., in a situation where the UE does not account for muting and/or beam transmission patterns associated with a base station and/or repeater. Moreover, a base station and/or repeater may make use of muting patterns to intentionally skip transmission of beam management signals to conserve resources (e.g., power resources, processing resources, and/or network resources, among other examples) without triggering beam failure and/or candidate beam detection failure at a UE. Furthermore, a base station and/or repeater may skip transmission of beam management signals for other purposes, such as serving multiple sets of UEs and or base stations via TDM and/or spatial division multiplexing (SDM), among other examples, without triggering beam failure and/or candidate beam detection failure at a UE.

Figure 8:
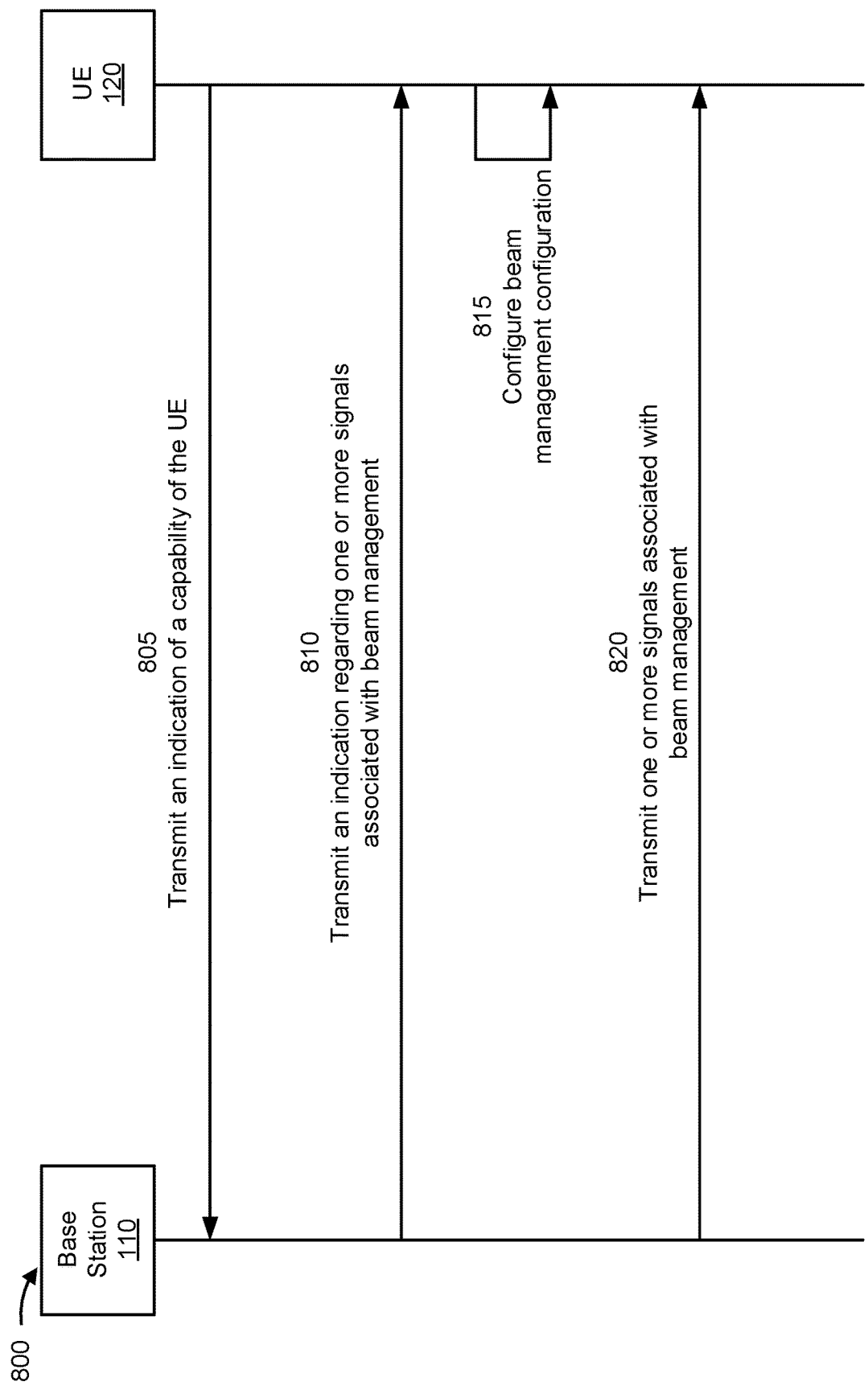
FIGS. 8 and 9 are diagrams illustrating examples associated with configuring beam management based on skipped transmissions of signals associated with beam management.

FIG. 8 is a diagram illustrating an example 800 associated with configuring beam management based on skipped transmissions of signals associated with beam management, in accordance with the present disclosure. As shown in FIG. 8, a UE (e.g., UE 120) may communicate (e.g., transmit an uplink transmission and/or receive a downlink transmission) with a base station (e.g., base station 110). The UE and the base station may be part of a wireless network (e.g., wireless network 100).

As shown by reference number 805, the UE may transmit, and the base station may receive, an indication of a capability of the UE to configure beam management in a manner designed to enable the base station to skip transmissions of one or more signals associated with beam management. For example, the UE may indicate a capability of the UE to configure beam management of the UE to account for the base station skipping transmission of SSB, CSI-RS, and/or the like without triggering beam failure and/or candidate beam detection failure. In some aspects, the UE may transmit the indication via RRC signaling, one or more MAC CEs, and/or a physical uplink control channel (PUCCH) message, among other examples.

As shown by reference number 810, the base station may transmit, and the UE may receive (e.g., via DCI, MAC-CE, RRC, physical downlink control channel (PDCCH), and/or physical downlink shared channel (PDSCH), among other examples), an indication regarding one or more signals (e.g., SSB and/or CSI-RS, among other examples) associated with beam management. For example, the base station may transmit an indication that the base station, and/or a repeater associated with the base station, is skipping transmission of the one or more signals, which the UE may otherwise be expecting to receive and use for beam management purposes. In some aspects the indication may be transmitted via a repeater that forwards communications on behalf of the base station, e.g., as described herein.

The indication may be in a variety of forms. In some aspects, the indication may be or include a beam sweeping pattern of the base station or a repeater associated with the base station. For example, the indication may include information indicating when, and on which beam, the base station and/or repeater will transmit the one or more signals. This indication may enable the UE to configure beam management in a manner designed to account for a beam sweeping pattern that may result in skipped transmission(s) of the one or more signals the UE would otherwise use for beam management, as described herein.

In some aspects, the indication may be or include a muting pattern of the base station or the repeater. For example, the indication may include information indicating when the base station and/or repeater may mute (e.g., stop, power off, and/or the like) transmission(s) of the one or more signals (e.g., for the purposes of conserving power resources, processing resources, communication resources, and/or the like).

In some aspects, the indication indicates an aperiodic time period. For example, the indication may specify a single transmission of the one or more signals that is to be skipped (e.g., for base station and/or repeater resource conservation purposes, load balancing purposes, and/or the like). As another example, the indication may specify multiple transmissions that are to be skipped without an associated pattern. Additionally, or alternatively, the indication may identify transmissions of the one or more signals that will be skipped in an otherwise aperiodic, or irregular, manner.

In some aspects, the indication may be or include one or more SSB-based radio resource management (RRM) measurement timing configuration (SMTC) windows associated with one or more frequency layers. For example, rather than explicitly indicating that the one or more signals are to be skipped, the indication may be in the form of an SMTC (e.g., identifying one or more SMTC windows) that the base station and/or repeater uses to indicate that the UE should perform a measurement at an identified time or times and that the UE should not expect to receive the one or more signals associated with beam management at the identified time or times. The one or more SMTC windows may, in some aspects, be or include one or more intra-carrier SMTC windows, and/or a plurality of SMTC windows at different frequency layers. In this situation, the UE may be configured to perform measurements at times when the base station and/or repeater will be skipping transmission of the one or more signals.

In some aspects, the indication may be or include data indicating one or more measurement gaps. For example, rather than explicitly indicating that the one or more signals are to be skipped, the indication may be in the form of a measurement gap configuration that the base station and/or repeater uses to indicate that the UE should perform a measurement at an identified time or times, and that the UE should not expect to receive the one or more signals associated with beam management at the identified time or times. In this situation, the UE may be configured to perform measurements at times when the base station and/or repeater will be skipping transmission of the one or more signals.

The foregoing example indications, alone or in combination, may enable the UE to configure signal measuring functionality and beam management in a manner designed to account for a base station and/or repeater beam sweeping pattern, muting pattern, and/or the like, which may result in skipped transmission(s) of the one or more signals the UE would otherwise use for beam management, as described herein.

As shown by reference number 815, the UE may configure a beam management configuration of the UE based at least in part on the indication. For example, the UE may configure a beam selection procedure, beam refinement procedure, beam failure detection (BFD) procedure, and/or candidate beam detection failure procedure, among other examples (e.g., as described herein), based at least in part on the indication. By way of example, the UE may configure beam management in a manner designed to forego beam selection, beam refinement, BFD, and/or extend evaluation periods for one or more beam management procedures, when the one or more signals associated with beam management are going to be skipped.

In some aspects, configuring the beam management configuration may include adjusting one or more evaluation periods associated with beam measurement. For example, while a beam selection procedure, beam refinement procedure, BFD procedure, and/or candidate beam detection failure procedure may be associated with a period of time for evaluating signals, the UE may extend the period of time based at least in part on the indication indicating that the UE will not receive the one or more signals (e.g., SSB and/or CSI-RS signals, among other examples) without extending the period of time.

By way of example, when performing BFD, the UE may evaluate whether downlink radio link quality on a configured SSB resource in a set $\bar{q}_0$, estimated over the last $T_{Evaluate\_BFD\_SSB}$ ms period, becomes worse than a threshold $Q_{out\_LR\_SSB}$ within the $T_{Evaluate\_BFD\_SSB}$ ms period. For FR1, the value of $T_{Evaluate\_BFD\_SSB}$ may be defined in Table 1.

TABLE 1

Evaluation period $T_{Evaluate\_BFD\_SSB}$ for FR1

| Configuration | $T_{Evaluate\_BFD\_SSB}$ (ms) |
|---|---|
| no DRX | Max(50, Ceil(5 × P) × $T_{SSB}$) |
| DRX cycle ≤ 320 ms | Max(50, Ceil(7.5 × P) × Max($T_{DRX}$,$T_{SSB}$)) |
| DRX cycle > 320 ms | Ceil(5 × P) × $T_{DRX}$ |

Note:
$T_{SSB}$ is the periodicity of SSB in the set $\bar{q}_0$.
$T_{DRX}$ is the discontinuous reception (DRX) cycle length.

For FR1, the evaluation period (P) may be calculated using formula (1):

$$P = \frac{1}{1 - \frac{T_{SSB}}{MGRP} - \frac{T_{SSB}}{T_{pattern}}} \quad (1)$$

Where $T_{pattern}$ denotes a periodicity of a beam sweeping pattern or muting pattern, and when the BFD-RS resource is partially overlapped with a measurement gap and the BFD-RS resource is partially overlapped with the beam sweeping pattern or muting pattern and the beam sweeping pattern or muting pattern is not overlapped with measurement gap. The foregoing evaluation period calculation is one example, and other examples may differ, including other examples for other frequency ranges (e.g., frequency ranges other than FR1, such as FR2 and higher).

In some aspects, when the UE adjusts the one or more evaluation periods, the UE may adjust the one or more evaluation periods using a scaling factor to extend the one or more evaluation periods. For example, a scaling factor may be applied to an evaluation period, where the scaling factor may depend on a combination of a measurement gap and SMTCs of each frequency layer (e.g., four SMTCs of each frequency layer).

In some aspects, the UE may determine that the future time period(s) overlap with beam management reference signals or L3 measurement windows. In this situation, the UE may configure the beam management configuration based at least in part on the foregoing determination. For example, the UE may check if a "null period" of a beam sweeping pattern, muting pattern, and/or the like, overlaps with the UE's beam management reference signals or L3 measurement windows, and adjust an evaluation period accordingly, e.g., to avoid BFD, candidate beam detection failure, and/or the like.

In some aspects, the beam management reference signals are associated with BFD, candidate beam detection, radio link monitoring, L1-RSRP calculation, and/or L1-signal-to-interference-plus-noise ratio (L1-SINR) calculation, among other examples. In some aspects, the L3 measurement windows are associated with SMTC (e.g., one or more SMTC windows), a gap for intra-carrier, inter-carrier, or inter-RAT measurement, and/or a measurement gap for self-interference, among other examples.

As shown by reference number 820, the base station may transmit, and the UE may receive, one or more second signals (e.g., SSB and/or CSI-RS, among other examples) associated with beam management. For example, after sending the indication that enables the UE to configure beam management based on one or more skipped beam management signals, the base station may proceed to transmit one or more second signals for beam management. In other words, while the base station may be skipping some signals for beam management, the second signals associated with beam management may still be transmitted to the UE. In some aspects, the one or more second signals associated with beam management may be transmitted via a repeater (e.g., as described herein).

In some aspects, transmitting the second signal(s) includes transmitting the second signal(s) during a period of time that corresponds to a time other than one or more measurement gaps. For example, while the indication regarding the one or more signals enabled the UE to configure beam management (e.g., to avoid BFD and/or candidate beam failure detection during the one or more measurement gaps), the second signal(s) may be transmitted at other times, such that the UE may receive and perform one or more beam management procedures using the second signal(s).

As indicated above, FIG. 8 is provided as an example. Other examples may differ from what is described with respect to FIG. 8.

Figure 9:
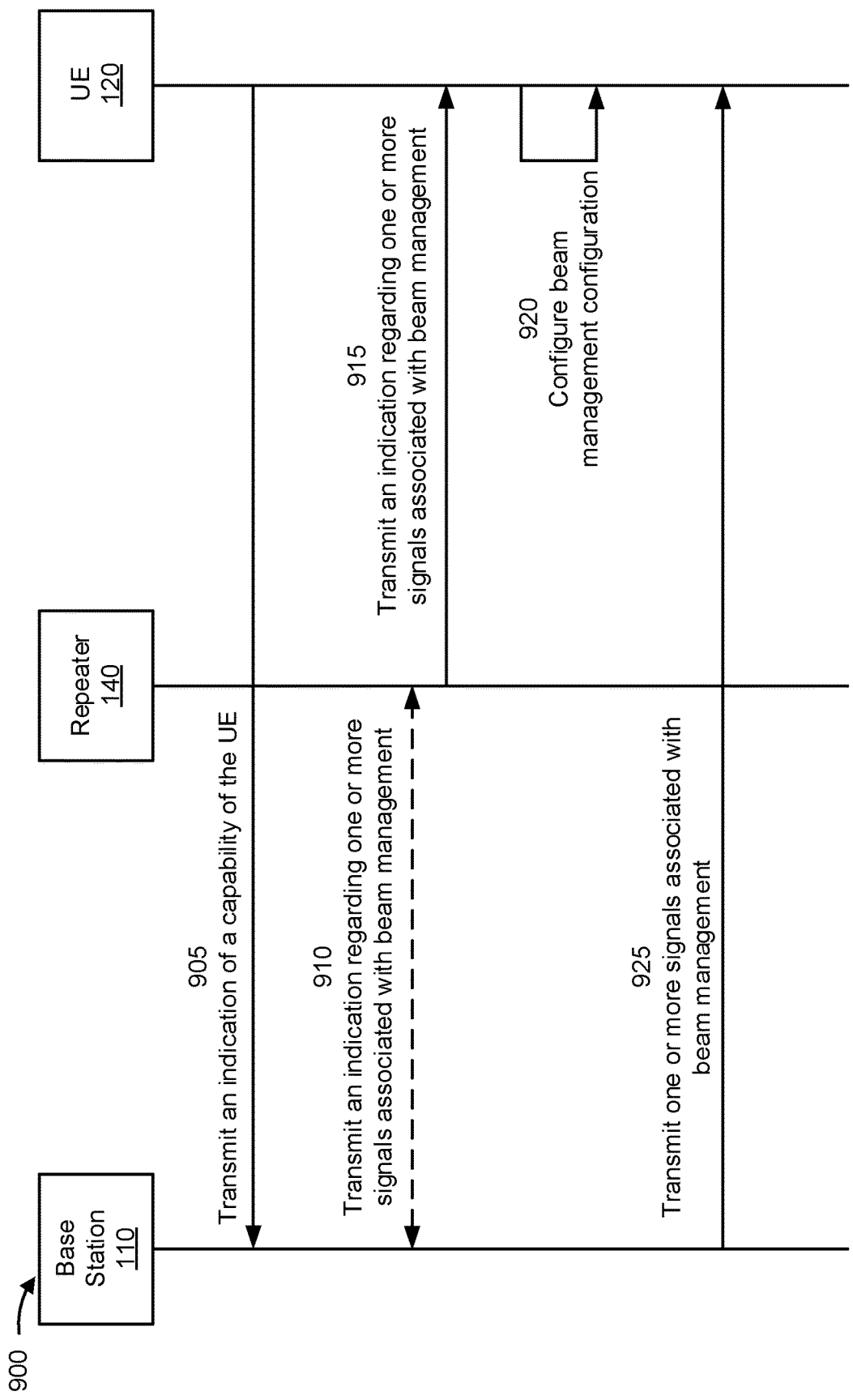

FIG. 9 is a diagram illustrating an example 900 associated with configuring beam management based on skipped transmissions of signals associated with beam management, in accordance with the present disclosure. As shown in FIG. 9, a UE (e.g., UE 120), a base station (e.g., base station 110), and/or a repeater (e.g., repeater 140) may communicate with one another. The UE, base station, and repeater may be part of a wireless network (e.g., wireless network 100).

As shown by reference number 905, the UE may transmit, and the base station may receive, an indication of a capability of the UE to configure beam management in a manner designed to enable the base station to skip transmissions of one or more signals associated with beam management. For example, the UE may indicate a capability of the UE to configure beam management of the UE to account for the base station skipping transmission of SSB, CSI-RS, and/or the like without triggering beam failure and/or candidate beam detection failure. In some aspects, the UE may transmit the indication via RRC signaling, one or more MAC CEs, and/or a PUCCH message, among other examples. In some aspects, the UE may transmit, and the base station may receive, the indication via the repeater.

As shown by reference number 910, the repeater may transmit and/or receive, and the base station may transmit and/or receive, an indication regarding one or more signals associated with beam management. For example, the base station may transmit, and the repeater may receive, the indication in a manner described herein, e.g., with reference to 810 of example 800, when the repeater forwards the indication on behalf of the base station.

In some aspects, the repeater may transmit, and the base station may receive, the indication regarding the one or more signals associated with beam management. For example, the repeater may transmit, and the base station may receive, information indicating a transmission pattern and/or a muting pattern of the repeater. The transmission pattern may indicate, for example, a pattern used by the repeater for transmission of the one or more signals associated with beam management, such as a time and/or spatial resource pattern used to forward signals at different times and/or via different beams (e.g., as shown and described herein with respect to FIGS. 6 and 7). The muting pattern may indicate, for example, a pattern used by the repeater for muting the repeater's transmissions (e.g., for conserving power resources, processing resources, communication resources, and/or the like).

In some aspects, the indication, and/or the information indicating the transmission pattern and/or muting pattern, may be associated with a PUCCH and/or physical uplink shared channel (PUSCH). For example, the repeater may transmit the indication and/or the information via PUCCH and/or PUSCH.

As shown by reference number 915, the repeater may transmit, and the UE may receive, an indication regarding the one or more signals associated with beam management. In some aspects, the indication may be transmitted on behalf of the base station in a manner described herein, e.g., with reference to 810 of example 800, when the repeater forwards the indication on behalf of the base station. In some aspects, the indication may be transmitted on behalf of the repeater in a manner described herein, e.g., with reference to 910. For example, the repeater may inform the base station regarding the transmission pattern and/or muting pattern of the repeater, and the base station may then transmit an indication regarding the transmission pattern and/or muting pattern of the repeater to the UE, as described herein.

In some aspects, the indication may be or include a downlink signal, which may be associated with DCI, a MAC-CE, RRC, PDCCH, PDSCH, or a reference signal. For example, the repeater may inform the UE directly regarding the one or more signals associated with beam management that are to be skipped (e.g., the transmission pattern and/or muting pattern of the repeater).

As shown by reference number 920, the UE may configure a beam management configuration of the UE based at least in part on the indication. For example, the UE may configure the beam management configuration in a manner described herein, e.g., with reference to 815 of example 800.

As shown by reference number 925, the base station may transmit, and the UE may receive, one or more signals associated with beam management. For example, the base station may transmit, and the UE may receive, the one or more signals associated with beam management in a manner described herein, e.g., with reference to 820 of example 800. As described herein, the one or more signals associated with beam management may be transmitted via the repeater.

By way of example, in a situation similar to that described above with reference to example 600 of FIG. 6, the repeater may have a transmission schedule that forwards communications from the base station to the UE using a first transmit beam at times t1, t3, t5, and so on. After the UE receives the indication regarding the transmission pattern and configures the UE beam management procedures, base station may transmit one or more signals associated with beam management (e.g., SSB and/or CSI-RS, among other examples) to the repeater, which may then forward the one or more signals to the UE via the first transmit beam and at a time that corresponds to t1, t3, t5, and so on. This may enable the UE to account for the repeater's transmission schedule when configuring beam management procedures.

As indicated above, FIG. 9 is provided as an example. Other examples may differ from what is described with respect to FIG. 9.

In this way, some techniques and apparatuses described herein may enable a base station and/or repeater to provide information that enables a UE to configure beam management in a manner designed to account for a muting pattern, beam transmission pattern, and/or the like, associated with the base station and/or repeater. As a result, the UE may avoid unnecessarily declaring beam failure and/or candidate beam detection failure. This may conserve UE resources (e.g., power resources, processing resources, and/or network resources, among other examples) associated with beam sweeping, a handover process, or other inefficiencies that might otherwise arise in a situation where the UE did not account for skipped beam management signal transmissions. In addition, the UE may conserve resources (e.g., power resources, processing resources, and/or network resources, among other examples) that might otherwise be used to extend beam evaluation periods associated with skipped beam management signal transmissions, e.g., in a situation where the UE does not account for muting and/or beam transmission patterns associated with a base station and/or repeater. Moreover, a base station and/or repeater may make use of muting patterns to intentionally skip transmission of beam management signals to conserve resources (e.g., power resources, processing resources, and/or network resources, among other examples) without triggering beam failure and/or candidate beam detection failure at a UE. Furthermore, a base station and/or repeater may skip transmission of beam management signals for other purposes, such as serving multiple sets of UEs and or base stations via TDM and/or SDM, among other examples, without triggering beam failure and/or candidate beam detection failure at a UE.

FIG. 10 is a diagram illustrating an example process 1000 performed, for example, by a UE, in accordance with the present disclosure. Example process 1000 is an example where the UE (e.g., UE 120) performs operations associated with configuring beam management based on skipped transmissions of signals associated with beam management.

As shown in FIG. 10, in some aspects, process 1000 may include receiving an indication regarding one or more signals associated with beam management, the indication indicating one or more future time periods for which the UE may not receive one or more transmissions of the one or more signals (block 1010). For example, the UE (e.g., using communication manager 150 and/or reception component 1302, depicted in FIG. 13) may receive an indication regarding one or more signals associated with beam management, the indication indicating one or more future time periods for which the UE may not receive one or more transmissions of the one or more signals, as described above.

As further shown in FIG. 10, in some aspects, process 1000 may include configuring a beam management configuration of the UE based at least in part on the indication (block 1020). For example, the UE (e.g., using communication manager 150 and/or beam management component 1308, depicted in FIG. 13) may configure a beam management configuration of the UE based at least in part on the indication, as described above.

Process 1000 may include additional aspects, such as any single aspect or any combination of aspects described below and/or in connection with one or more other processes described elsewhere herein.

In a first aspect, the indication comprises a beam sweeping pattern of at least one of a base station or a repeater associated with the base station. In a second aspect, alone or in combination with the first aspect, the indication comprises a muting pattern of at least one of a base station or a repeater associated with the base station.

In a third aspect, alone or in combination with one or more of the first and second aspects, the indication indicates an aperiodic time period. In a fourth aspect, alone or in combination with one or more of the first through third aspects, the indication is received from a base station or a repeater associated with the base station.

In a fifth aspect, alone or in combination with one or more of the first through fourth aspects, the indication comprises one or more SMTC windows associated with one or more frequency layers. In a sixth aspect, alone or in combination with the fifth aspect, the one or more SMTC windows comprise at least one of one or more intra-carrier SMTC windows, or a plurality of SMTC windows at different frequency layers.

In a seventh aspect, alone or in combination with one or more of the first through sixth aspects, the indication comprises data indicating one or more measurement gaps. In an eighth aspect, alone or in combination with one or more of the first through seventh aspects, the indication comprises a downlink signal associated with one or more of DCI, a MAC-CE, RRC, PDCCH, PDSCH, or a reference signal.

In a ninth aspect, alone or in combination with one or more of the first through eighth aspects, configuring the beam management configuration comprises adjusting one or more evaluation periods associated with beam measurement. In a tenth aspect, alone or in combination with the ninth aspect, adjusting the one or more evaluation periods comprises adjusting the one or more evaluation periods using a scaling factor to extend the one or more evaluation periods.

In an eleventh aspect, alone or in combination with one or more of the first through tenth aspects, process 1000 includes determining that at least one of the one or more future time periods overlap with at least one of beam management reference signals or L3 measurement windows, and wherein configuring the beam management configuration comprises configuring the beam management configuration based at least in part on determining that the at least one of the one or more future time periods overlap with the at least one of the beam management reference signals or the L3 measurement windows.

In a twelfth aspect, alone or in combination with the eleventh aspect, the beam management reference signals are associated with at least one of BFD, candidate beam detection, radio link monitoring, L1-RSRP calculation, or L1-SINR calculation. In a thirteenth aspect, alone or in combination with the eleventh or twelfth aspects, the L3 measurement windows are associated with one or more of SMTC, a gap for intra-carrier, inter-carrier, or inter-RAT measurement, or a measurement gap for self-interference.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a base station, in accordance with the present disclosure. Example process 1100 is an example where the base station (e.g., base station 110) performs operations associated with configuring beam management based on skipped transmissions of signals associated with beam management.

As shown in FIG. 11, in some aspects, process 1100 may include transmitting an indication regarding one or more first signals associated with beam management, the indication indicating one or more future time periods for which the base station will skip transmission of the one or more signals (block 1110). For example, the base station (e.g., using communication manager 160 and/or transmission component 1404, depicted in FIG. 14) may transmit an indication regarding one or more first signals associated with beam management, the indication indicating one or more future time periods for which the base station will skip transmission of the one or more signals, as described above.

As further shown in FIG. 11, in some aspects, process 1100 may include transmitting, based at least in part on the indication, one or more second signals associated with beam management (block 1120). For example, the base station (e.g., using communication manager 160 and/or transmission component 1404, depicted in FIG. 14) may transmit, based at least in part on the indication, one or more second signals associated with beam management, as described above.

Process 1100 may include additional aspects, such as any single aspect or any combination of aspects described below and/or in connection with one or more other processes described elsewhere herein.

In a first aspect, the indication comprises a beam sweeping pattern of at least one of the base station or a repeater associated with the base station. In a second aspect, alone or in combination with the first aspect, the indication comprises a muting pattern of at least one of the base station or a repeater associated with the base station.

In a third aspect, alone or in combination with one or more of the first and second aspects, the indication indicates an aperiodic time period. In a fourth aspect, alone or in combination with one or more of the first through third aspects, the indication is transmitted via a repeater associated with the base station.

In a fifth aspect, alone or in combination with one or more of the first through fourth aspects, the indication comprises one or more SMTC windows associated with one or more frequency layers. In a sixth aspect, alone or in combination with the fifth aspect, the one or more SMTC windows comprise at least one of one or more intra-carrier SMTC windows, or a plurality of SMTC windows at different frequency layers.

In a seventh aspect, alone or in combination with one or more of the first through sixth aspects, the indication comprises data indicating one or more measurement gaps. In an eighth aspect, alone or in combination with the seventh aspect, transmitting the one or more second signals comprises transmitting the one or more second signals during a period of time that corresponds to a time other than the one or more measurement gaps.

In a ninth aspect, alone or in combination with one or more of the first through eighth aspects, the indication comprises a downlink signal associated with one or more of DCI, a MAC-CE, RRC, PDCCH, PDSCH, or a reference signal.

In a tenth aspect, alone or in combination with one or more of the first through ninth aspects, the one or more future time periods are based at least on part on a muting schedule associated with the base station.

In an eleventh aspect, alone or in combination with one or more of the first through tenth aspects, the one or more future time periods are based at least in part on a transmission pattern associated with a repeater associated with the base station. In a twelfth aspect, alone or in combination with the eleventh aspect, process 1100 includes receiving, via the repeater, information indicating the transmission pattern. In a thirteenth aspect, alone or in combination with one or more of the eleventh or twelfth aspects, the information indicating the transmission pattern is associated with one or more of a PUCCH, or a PUSCH.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel. In some aspects, one or more blocks and/or aspects of process 1100 may be performed by a repeater (e.g., repeater 140).

FIG. 12 is a diagram illustrating an example process 1200 performed, for example, by a repeater, in accordance with the present disclosure. Example process 1200 is an example where the repeater (e.g., repeater 140) performs operations associated with configuring beam management based on skipped transmissions of signals associated with beam management.

As shown in FIG. 12, in some aspects, process 1200 may include transmitting an indication regarding one or more first signals associated with beam management, the indication indicating one or more future time periods for which the repeater will skip forwarding of the one or more signals via a first set of resources (block 1210). For example, the repeater (e.g., using communication manager 170 and/or transmission component 1504, depicted in FIG. 15) may transmit an indication regarding one or more first signals associated with beam management, the indication indicating one or more future time periods for which the repeater will skip forwarding of the one or more signals via a first set of resources, as described above.

As further shown in FIG. 12, in some aspects, process 1200 may include transmitting, via the first set of resources and during one or more other time periods that do not coincide with the future time periods, one or more second signals associated with beam management (block 1220). For example, the repeater (e.g., using communication manager 170 and/or transmission component 1504, depicted in FIG. 15) may transmit, via the first set of resources and during one or more other time periods that do not coincide with the future time periods, one or more second signals associated with beam management, as described above.

Process 1200 may include additional aspects, such as any single aspect or any combination of aspects described below and/or in connection with one or more other processes described elsewhere herein.

In a first aspect, the indication comprises a beam sweeping pattern of at least one of the repeater or a base station associated with the repeater. In a second aspect, alone or in combination with the first aspect, the indication comprises a muting pattern of at least one of the repeater or a base station associated with the repeater.

In a third aspect, alone or in combination with one or more of the first and second aspects, the indication indicates an aperiodic time period. In a fourth aspect, alone or in combination with one or more of the first through third aspects, the indication is transmitted via a base station associated with the repeater.

In a fifth aspect, alone or in combination with one or more of the first through fourth aspects, the indication comprises one or more SMTC windows associated with one or more frequency layers. In a sixth aspect, alone or in combination with the fifth aspect, the one or more SMTC windows comprise at least one of one or more intra-carrier SMTC windows, or a plurality of SMTC windows at different frequency layers.

In a seventh aspect, alone or in combination with one or more of the first through sixth aspects, the indication comprises data indicating one or more measurement gaps. In an eighth aspect, alone or in combination with the seventh aspect, the one or more other time periods correspond to time periods other than the one or more measurement gaps.

In a ninth aspect, alone or in combination with one or more of the first through eighth aspects, the indication comprises a downlink signal associated with one or more of DCI, a MAC-CE, RRC, PDCCH, PDSCH, or a reference signal.

In a tenth aspect, alone or in combination with one or more of the first through ninth aspects, the one or more future time periods are based at least in part on a muting schedule associated with the repeater. In an eleventh aspect, alone or in combination with one or more of the first through tenth aspects, the one or more future time periods are based at least in part on a transmission pattern associated with the repeater.

In a twelfth aspect, alone or in combination with one or more of the first through eleventh aspects, process 1200 includes transmitting, to a base station, information indicating at least one of a transmission pattern or a muting pattern associated with the repeater. In a thirteenth aspect, alone or in combination with the twelfth aspect, the information indicating the at least one of the transmission pattern or the muting pattern is associated with one or more of a PUCCH, or a PUSCH.

In a fourteenth aspect, alone or in combination with one or more of the first through thirteenth aspects, the first set of resources comprises a first transmit beam.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
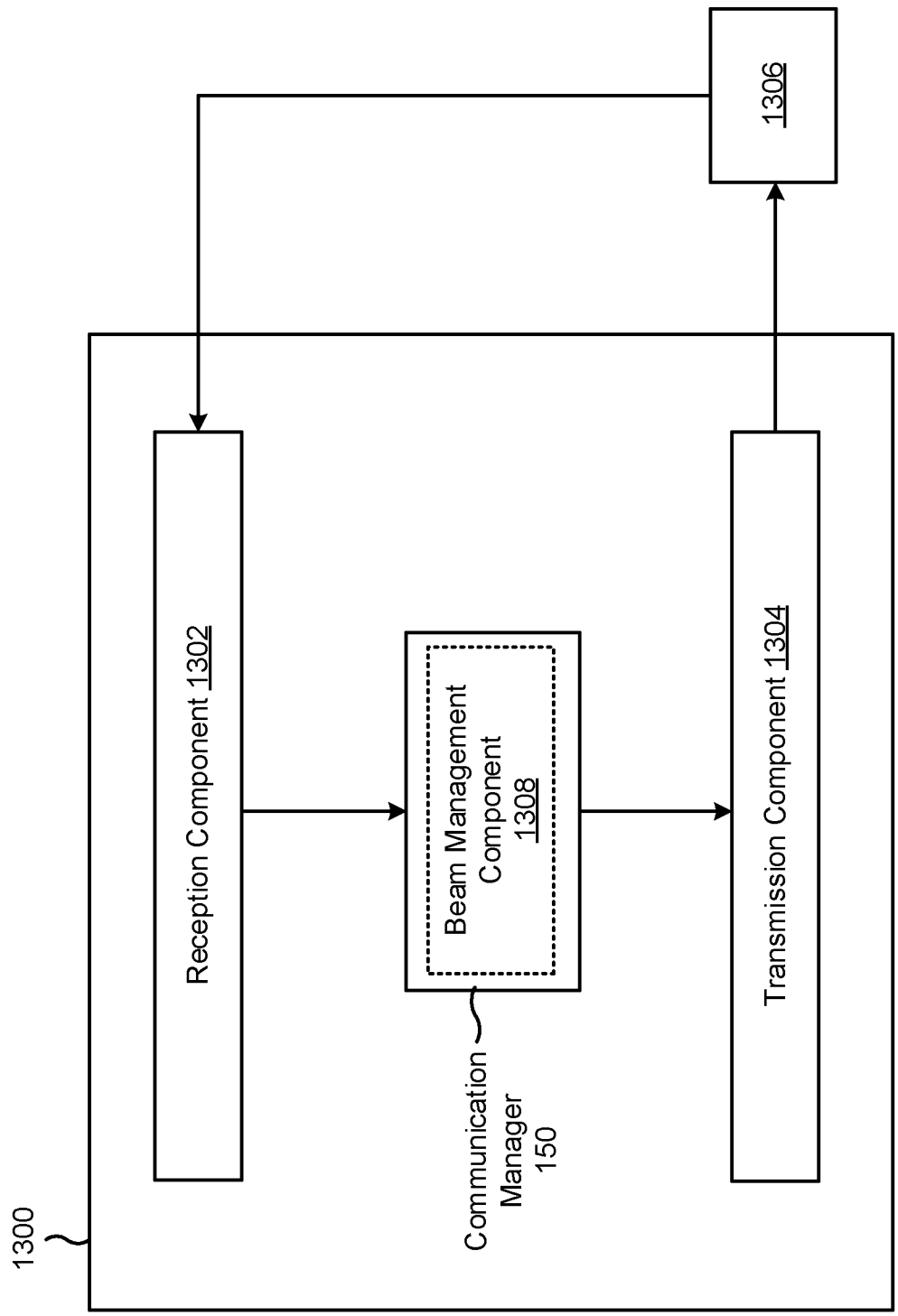
FIGS. 13-15 are block diagrams of example apparatuses for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a beam management component 1308, among other examples.

In some aspects, the apparatus 1300 may be configured to perform one or more operations described herein in connection with FIGS. 8-12. Additionally, or alternatively, the apparatus 1300 may be configured to perform one or more processes described herein, such as process 1000 of FIG. 10. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive an indication regarding one or more signals associated with beam management the indication indicating one or more future time periods for which the UE may not receive one or more transmissions of the one or more signals. The beam management component 1308 may configure a beam management configuration of the UE based at least in part on the indication.

The beam management component 1308 may determine that at least one of the one or more future time periods overlap with at least one of beam management reference signals or L3 measurement windows.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
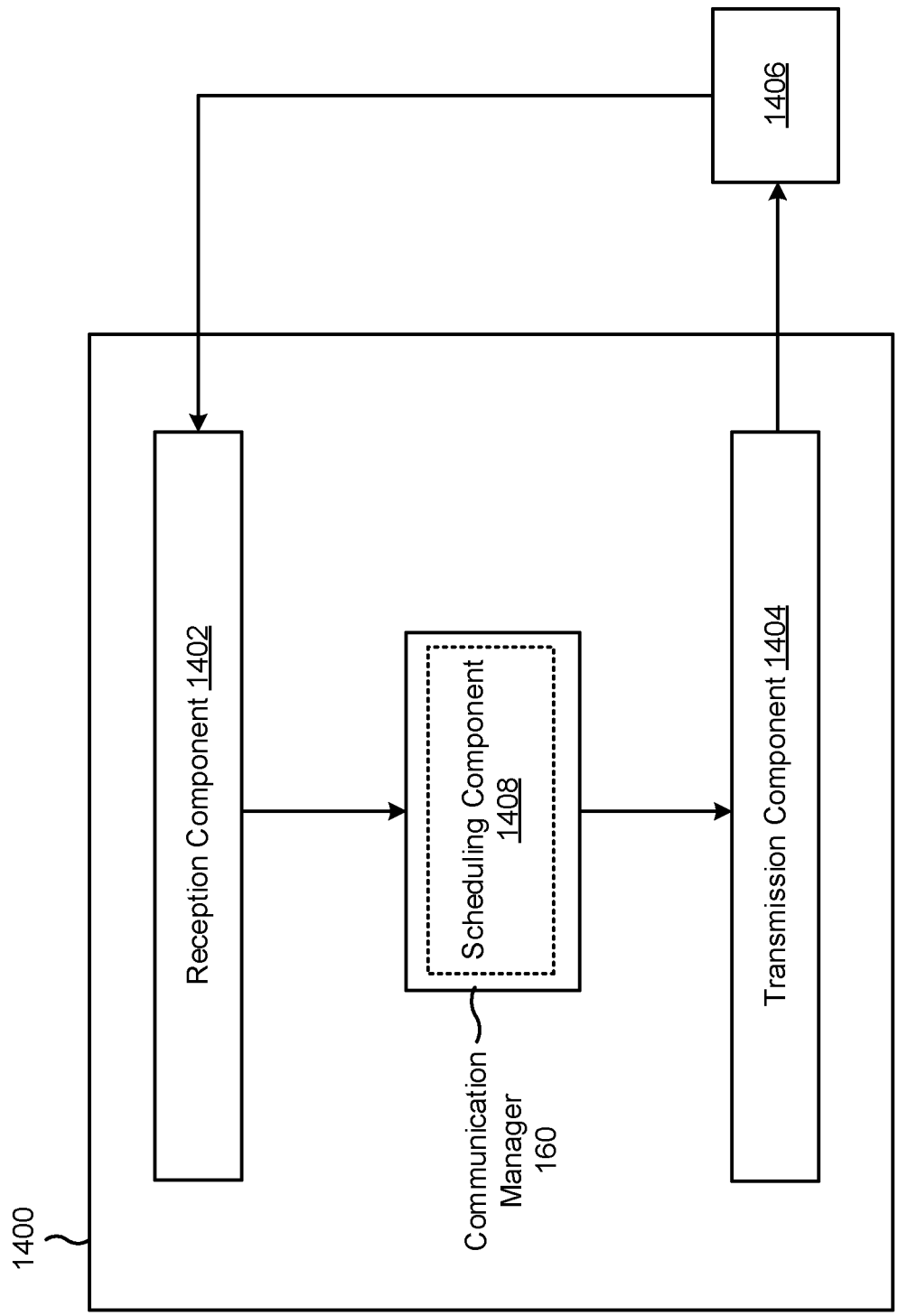

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 160. The communication manager 160 may include a scheduling component 1408, among other examples.

In some aspects, the apparatus 1400 may be configured to perform one or more operations described herein in connection with FIGS. 8-12. Additionally, or alternatively, the apparatus 1400 may be configured to perform one or more processes described herein, such as process 1100 of FIG. 11, process 1200 of FIG. 12, or a combination thereof. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described in connection with FIG. 2. In some aspects, the reception component 1402 may receive, via the repeater, information indicating the transmission pattern.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The transmission component 1404 may transmit an indication regarding one or more first signals associated with beam management the indication indicating one or more future time periods for which the base station will skip transmission of the one or more signals. The transmission component 1404 may transmit, based at least in part on the indication, one or more second signals associated with beam management.

The scheduling component 1408 may establish a transmission pattern or muting pattern for the base station.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
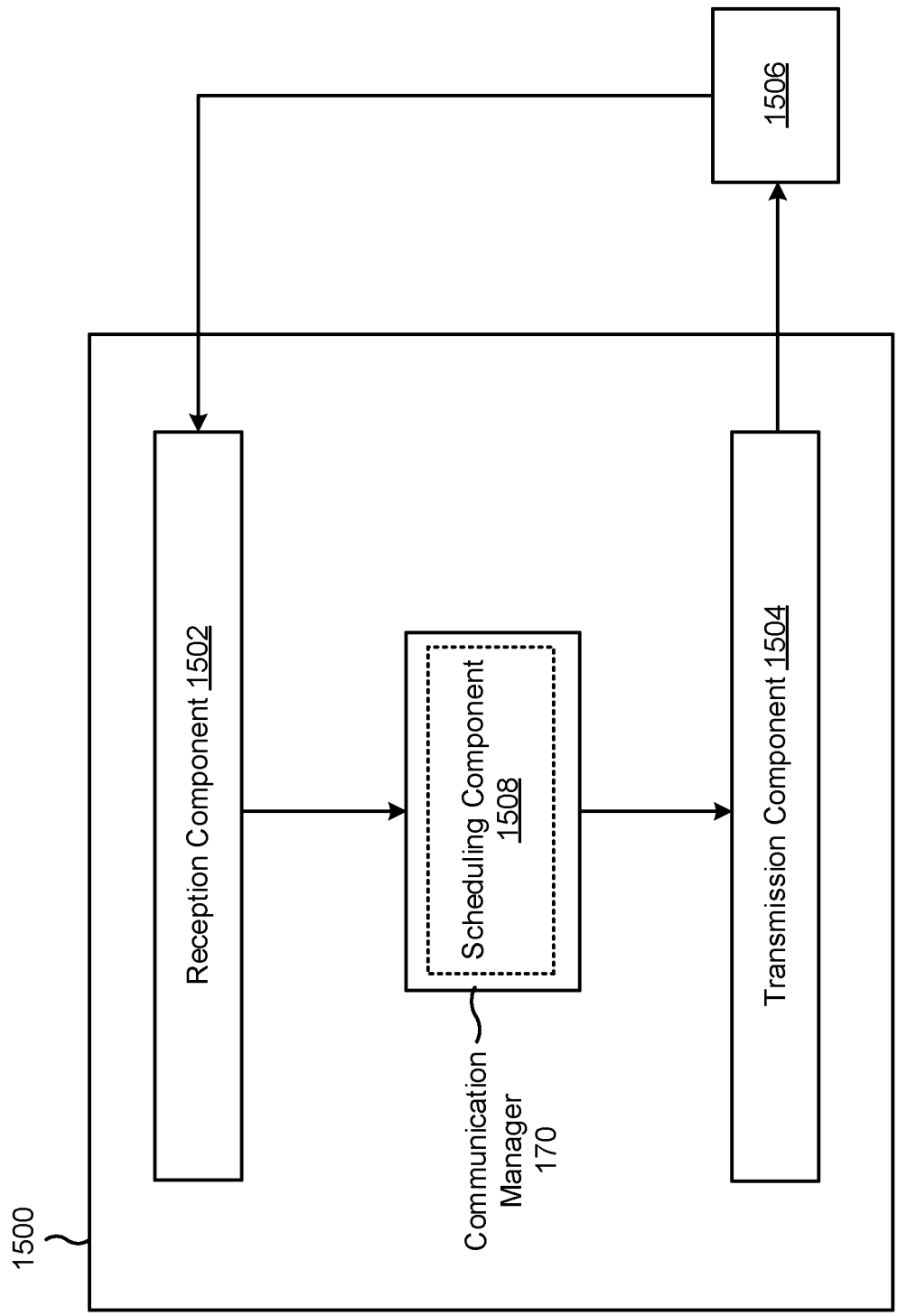

FIG. 15 is a block diagram of an example apparatus 1500 for wireless communication. The apparatus 1500 may be a repeater, or a repeater may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 170. The communication manager 170 may include a scheduling component 1508, among other examples.

In some aspects, the apparatus 1500 may be configured to perform one or more operations described herein in connection with FIGS. 8-12. Additionally, or alternatively, the apparatus 1500 may be configured to perform one or more processes described herein, such as process 1100 of FIG. 11, process 1200 of FIG. 12, or a combination thereof. In some aspects, the apparatus 1500 and/or one or more components shown in FIG. 15 may include one or more components of the repeater described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the repeater described in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the repeater described in connection with FIG. 2. In some aspects, the transmission component 1504 may be co-located with the reception component 1502 in a transceiver.

The transmission component 1504 may transmit an indication regarding one or more first signals associated with beam management the indication indicating one or more future time periods for which the repeater will skip forwarding of the one or more signals via a first set of resources. The transmission component 1504 may transmit, via the first set of resources and during one or more other time periods that do not coincide with the future time periods, one or more second signals associated with beam management.

The transmission component 1504 may transmit, to a base station, information indicating at least one of a transmission pattern or a muting pattern associated with the repeater. The scheduling component 1508 may establish a transmission pattern or muting pattern for the repeater.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: receiving an indication regarding one or more signals associated with beam management, the indication indicating one or more future time periods for which the UE may not receive one or more transmissions of the one or more signals; and configuring a beam management configuration of the UE based at least in part on the indication.

Aspect 2: The method of Aspect 1, wherein the indication comprises a beam sweeping pattern of at least one of a base station or a repeater associated with the base station.

Aspect 3: The method of Aspect 1 or 2, wherein the indication comprises a muting pattern of at least one of a base station or a repeater associated with the base station.

Aspect 4: The method of any of Aspects 1-3, wherein the indication indicates an aperiodic time period.

Aspect 5: The method of any of Aspects 1-4, wherein the indication is received from a base station or a repeater associated with the base station.

Aspect 6: The method of any of Aspects 1-5, wherein the indication comprises one or more SMTC windows associated with one or more frequency layers.

Aspect 7: The method of Aspect 6, wherein the one or more SMTC windows comprise at least one of: one or more intra-carrier SMTC windows, or a plurality of SMTC windows at different frequency layers.

Aspect 8: The method of any of Aspects 1-7, wherein the indication comprises data indicating one or more measurement gaps.

Aspect 9: The method of any of Aspects 1-8, wherein the indication comprises a downlink signal associated with one or more of: downlink control information, a MAC-CE, RRC, PDCCH, PDSCH, or a reference signal.

Aspect 10: The method of any of Aspects 1-9, wherein configuring the beam management configuration comprises: adjusting one or more evaluation periods associated with beam measurement.

Aspect 11: The method of Aspect 10, wherein adjusting the one or more evaluation periods comprises: adjusting the one or more evaluation periods using a scaling factor to extend the one or more evaluation periods.

Aspect 12: The method of any of Aspects 1-11, further comprising: determining that at least one of the one or more future time periods overlap with at least one of beam management reference signals or L3 measurement windows; and wherein configuring the beam management configuration comprises: configuring the beam management configuration based at least in part on determining that the at least one of the one or more future time periods overlap with the at least one of the beam management reference signals or the L3 measurement windows.

Aspect 13: The method of Aspect 12, wherein the beam management reference signals are associated with at least one of: BFD, candidate beam detection, radio link monitoring, L1-RSRP calculation, or L1-SINR calculation.

Aspect 14: The method of Aspect 12, wherein the L3 measurement windows are associated with one or more of: SMTC, a gap for intra-carrier, inter-carrier, or inter-RAT measurement, or a measurement gap for self-interference.

Aspect 15: A method of wireless communication performed by a base station, comprising: transmitting an indication regarding one or more first signals associated with beam management, the indication indicating one or more future time periods for which the base station will skip transmission of the one or more signals; and transmitting, based at least in part on the indication, one or more second signals associated with beam management.

Aspect 16: The method of Aspect 15, wherein the indication comprises a beam sweeping pattern of at least one of the base station or a repeater associated with the base station.

Aspect 17: The method of Aspect 15 or 16, wherein the indication comprises a muting pattern of at least one of the base station or a repeater associated with the base station.

Aspect 18: The method of any of Aspects 15-17, wherein the indication indicates an aperiodic time period.

Aspect 19: The method of any of Aspects 15-18, wherein the indication is transmitted via a repeater associated with the base station.

Aspect 20: The method of any of Aspects 15-19, wherein the indication comprises one or more SMTC windows associated with one or more frequency layers.

Aspect 21: The method of Aspect 20, wherein the one or more SMTC windows comprise at least one of: one or more intra-carrier SMTC windows, or a plurality of SMTC windows at different frequency layers.

Aspect 22: The method of any of Aspects 15-21, wherein the indication comprises data indicating one or more measurement gaps.

Aspect 23: The method of Aspect 22, wherein transmitting the one or more second signals comprises: transmitting the one or more second signals during a period of time that corresponds to a time other than the one or more measurement gaps.

Aspect 24: The method of any of Aspects 15-23, wherein the indication comprises a downlink signal associated with one or more of: DCI, a MAC-CE, RRC, PDCCH, PDSCH, or a reference signal.

Aspect 25: The method of any of Aspects 15-24, wherein the one or more future time periods are based at least on part on a muting schedule associated with the base station.

Aspect 26: The method of any of Aspects 15-25, wherein the one or more future time periods are based at least in part on a transmission pattern associated with a repeater associated with the base station.

Aspect 27: The method of Aspect 26, further comprising: receiving, via the repeater, information indicating the transmission pattern.

Aspect 28: The method of Aspect 27, wherein the information indicating the transmission pattern is associated with one or more of: a PUCCH, or a PUSCH.

Aspect 29: A method of wireless communication performed by a repeater, comprising: transmitting an indication regarding one or more first signals associated with beam management, the indication indicating one or more future time periods for which the repeater will skip forwarding of the one or more signals via a first set of resources; and transmitting, via the first set of resources and during one or more other time periods that do not coincide with the future time periods, one or more second signals associated with beam management.

Aspect 30: The method of Aspect 29, wherein the indication comprises a beam sweeping pattern of at least one of the repeater or a base station associated with the repeater.

Aspect 31: The method of Aspect 29 or 30, wherein the indication comprises a muting pattern of at least one of the repeater or a base station associated with the repeater.

Aspect 32: The method of any of Aspects 29-31, wherein the indication indicates an aperiodic time period.

Aspect 33: The method of any of Aspects 29-32, wherein the indication is transmitted via a base station associated with the repeater.

Aspect 34: The method of any of Aspects 29-33, wherein the indication comprises one or more SMTC windows associated with one or more frequency layers.

Aspect 35: The method of Aspect 34, wherein the one or more SMTC windows comprise at least one of: one or more intra-carrier SMTC windows, or a plurality of SMTC windows at different frequency layers.

Aspect 36: The method of any of Aspects 29-35, wherein the indication comprises data indicating one or more measurement gaps.

Aspect 37: The method of Aspect 36, wherein the one or more other time periods correspond to time periods other than the one or more measurement gaps.

Aspect 38: The method of any of Aspects 29-37, wherein the indication comprises a downlink signal associated with one or more of: DCI, a MAC-CE, RRC, PDCCH, PDSCH, or a reference signal.

Aspect 39: The method of any of Aspects 29-38, wherein the one or more future time periods are based at least in part on a muting schedule associated with the repeater.

Aspect 40: The method of any of Aspects 29-39, wherein the one or more future time periods are based at least in part on a transmission pattern associated with the repeater.

Aspect 41: The method of any of Aspects 29-40, further comprising: transmitting, to a base station, information indicating at least one of a transmission pattern or a muting pattern associated with the repeater.

Aspect 42: The method of Aspect 41, wherein the information indicating the at least one of the transmission pattern or the muting pattern is associated with one or more of: a PUCCH, or a PUSCH.

Aspect 43: The method of any of Aspects 29-42, wherein the first set of resources comprises a first transmit beam.

Aspect 44: An apparatus for wireless communication at a device, comprising a processor; memory coupled with the processor; and instructions stored in the memory and executable by the processor to cause the apparatus to perform the method of one or more of Aspects 1-14.

Aspect 45: An apparatus for wireless communication at a device, comprising a processor; memory coupled with the processor; and instructions stored in the memory and executable by the processor to cause the apparatus to perform the method of one or more of Aspects 15-28.

Aspect 46: An apparatus for wireless communication at a device, comprising a processor; memory coupled with the processor; and instructions stored in the memory and executable by the processor to cause the apparatus to perform the method of one or more of Aspects 29-43.

Aspect 47: A device for wireless communication, comprising a memory and one or more processors coupled to the memory, the one or more processors configured to perform the method of one or more of Aspects 1-14.

Aspect 48: A device for wireless communication, comprising a memory and one or more processors coupled to the memory, the one or more processors configured to perform the method of one or more of Aspects 15-28.

Aspect 49: A device for wireless communication, comprising a memory and one or more processors coupled to the memory, the one or more processors configured to perform the method of one or more of Aspects 29-43.

Aspect 50: An apparatus for wireless communication, comprising at least one means for performing the method of one or more of Aspects 1-14.

Aspect 51: An apparatus for wireless communication, comprising at least one means for performing the method of one or more of Aspects 15-28.

Aspect 52: An apparatus for wireless communication, comprising at least one means for performing the method of one or more of Aspects 29-43.

Aspect 53: A non-transitory computer-readable medium storing code for wireless communication, the code comprising instructions executable by a processor to perform the method of one or more of Aspects 1-14.

Aspect 54: A non-transitory computer-readable medium storing code for wireless communication, the code comprising instructions executable by a processor to perform the method of one or more of Aspects 15-28.

Aspect 55: A non-transitory computer-readable medium storing code for wireless communication, the code comprising instructions executable by a processor to perform the method of one or more of Aspects 29-43.

Aspect 56: A non-transitory computer-readable medium storing a set of instructions for wireless communication, the set of instructions comprising one or more instructions that, when executed by one or more processors of a device, cause the device to perform the method of one or more of Aspects 1-14.

Aspect 57: A non-transitory computer-readable medium storing a set of instructions for wireless communication, the set of instructions comprising one or more instructions that, when executed by one or more processors of a device, cause the device to perform the method of one or more of Aspects 15-28.

Aspect 58: A non-transitory computer-readable medium storing a set of instructions for wireless communication, the set of instructions comprising one or more instructions that, when executed by one or more processors of a device, cause the device to perform the method of one or more of Aspects 29-43.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to cause the UE to:
receive an indication regarding one or more signals associated with beam management,
the indication indicating one or more future time periods for which a base station or a repeater is skipping one or more transmissions of the one or more signals associated with the beam management; and
configure a beam management configuration of the UE based at least in part on the indication.

2. The UE of claim 1, wherein the indication comprises a beam sweeping pattern of at least one of the base station or the repeater associated with the base station.

3. The UE of claim 1, wherein the indication comprises a muting pattern of at least one of the base station or the repeater associated with the base station.

4. The UE of claim 1, wherein the indication indicates that the one or more transmissions are skipped in an aperiodic manner.

5. The UE of claim 1, wherein the indication is received from the base station or the repeater associated with the base station.

6. The UE of claim 1, wherein the indication comprises one or more synchronization signal block (SSB)-based radio resource management (RRM) measurement timing configuration (SMTC) windows associated with one or more frequency layers.

7. The UE of claim 6, wherein the one or more SMTC windows comprise at least one of:
one or more intra-carrier SMTC windows, or
a plurality of SMTC windows at different frequency layers.

8. The UE of claim 1, wherein the indication comprises data indicating one or more measurement gaps.

9. The UE of claim 1, wherein the indication comprises a downlink signal associated with one or more of:
downlink control information,
a medium access control control element,
radio resource control,
physical downlink control channel,
physical downlink shared channel, or
a reference signal.

10. The UE of claim 1, wherein the one or more processors, to configure the beam management configuration, are configured to:
adjust one or more evaluation periods associated with beam measurement.

11. The UE of claim 10, wherein the one or more processors, to adjust the one or more evaluation periods, are configured to:
adjust the one or more evaluation periods using a scaling factor to extend the one or more evaluation periods.

12. The UE of claim 1, wherein the one or more processors are further configured to:
determine that at least one of the one or more future time periods overlap with at least one of beam management reference signals or L3 measurement windows; and
wherein the one or more processors, to configure the beam management configuration, are configured to:
configure the beam management configuration based at least in part on determining that the at least one of the one or more future time periods overlap with the at least one of the beam management reference signals or the L3 measurement windows.

13. The UE of claim 12, wherein the beam management reference signals are associated with at least one of:
beam failure detection,
candidate beam detection,
radio link monitoring,
L1-RSRP calculation, or
L1-SINR calculation.

14. The UE of claim 12, wherein the L3 measurement windows are associated with one or more of:
a synchronization signal block (SSB)-based radio resource management (RRM) measurement timing configuration (SMTC),
a gap for intra-carrier, inter-carrier, or inter-RAT measurement, or
a measurement gap for self-interference.

15. The UE of claim 1, wherein the indication comprises at least one of:
a beam sweeping pattern of the base station,
a beam sweeping pattern of the repeater associated with the base station,
a muting pattern of the base station, or
a muting pattern of the repeater.

16. A method of wireless communication performed by a user equipment (UE), comprising:
receiving an indication regarding one or more signals associated with beam management,
the indication indicating one or more future time periods for which a base station or a repeater is skipping one or more transmissions of the one or more signals associated with the beam management; and
configuring a beam management configuration of the UE based at least in part on the indication.

17. The method of claim 16, wherein the indication comprises a beam sweeping pattern of at least one of the base station or the repeater associated with the base station.

18. The method of claim 16, wherein the indication comprises a muting pattern of at least one of the base station or the repeater associated with the base station.

19. The method of claim 16, wherein the indication indicates that the one or more transmissions are skipped in an aperiodic manner.

20. The method of claim 16, wherein the indication is received from the base station or the repeater associated with the base station.

21. The method of claim 16, wherein the indication comprises one or more synchronization signal block (SSB)-based radio resource management (RRM) measurement timing configuration (SMTC) windows associated with one or more frequency layers.

22. The method of claim 21, wherein the one or more SMTC windows comprise at least one of:
one or more intra-carrier SMTC windows, or
a plurality of SMTC windows at different frequency layers.

23. The method of claim 16, wherein the indication comprises data indicating one or more measurement gaps.

24. The method of claim 16, wherein the indication comprises a downlink signal associated with one or more of:
downlink control information,
a medium access control control element,
radio resource control,
physical downlink control channel,
physical downlink shared channel, or
a reference signal.

25. The method of claim 16, wherein configuring the beam management configuration comprises:
adjusting one or more evaluation periods associated with beam measurement.

26. The method of claim 25, wherein adjusting the one or more evaluation periods comprises:
adjusting the one or more evaluation periods using a scaling factor to extend the one or more evaluation periods.

27. The method of claim 16, further comprising:
determining that at least one of the one or more future time periods overlap with at least one of beam management reference signals or L3 measurement windows, and wherein configuring the beam management configuration comprises:
configuring the beam management configuration based at least in part on determining that the at least one of the one or more future time periods overlap with the at least one of the beam management reference signals or the L3 measurement windows.

28. The method of claim 27, wherein the beam management reference signals are associated with at least one of:
beam failure detection,
candidate beam detection,
radio link monitoring,
L1-RSRP calculation, or
L1-SINR calculation.

29. A non-transitory computer-readable medium storing a set of instructions for wireless communication, the set of instructions comprising:
one or more instructions that, when executed by one or more processors of a user equipment (UE), cause the UE to:
receive an indication regarding one or more signals associated with beam management,
the indication indicating one or more future time periods for which a base station or a repeater is skipping one or more transmissions of the one or more signals associated with the beam management; and
configure a beam management configuration of the UE based at least in part on the indication.

30. An apparatus for wireless communication, comprising:
means for receiving an indication regarding one or more signals associated with beam management,
the indication indicating one or more future time periods for which a base station or a repeater is skipping one or more transmissions of the one or more signals associated with the beam management; and
means for configuring a beam management configuration of the apparatus based at least in part on the indication.

* * * * *